(12) United States Patent
Zicari et al.

(10) Patent No.: US 11,447,428 B2
(45) Date of Patent: Sep. 20, 2022

(54) ORGANIC AMMONIUM COMPOSITIONS AND METHODS OF THEIR USE AND MAKING

(71) Applicant: CALIFORNIA SAFE SOIL, LLC, McClellan, CA (US)

(72) Inventors: Steve Zicari, Davis, CA (US); Mark LeJeune, Woodland, CA (US); Daniel Morash, Sacramento, CA (US); Harold L. Leverenz, Dunnigan, AZ (US)

(73) Assignee: CALIFORNIA SAFE SOIL, LLC, McClellan, CA (US)

( * ) Notice: Subject to any disclaimer, the term of this patent is extended or adjusted under 35 U.S.C. 154(b) by 0 days.

(21) Appl. No.: 17/222,583

(22) Filed: Apr. 5, 2021

(65) Prior Publication Data

US 2021/0309582 A1    Oct. 7, 2021

Related U.S. Application Data

(60) Provisional application No. 63/005,093, filed on Apr. 3, 2020.

(51) Int. Cl.
*C05F 17/60* (2020.01)
*C05F 17/80* (2020.01)
(Continued)

(52) U.S. Cl.
CPC ............. *C05F 11/00* (2013.01); *B01D 3/205* (2013.01); *B01D 3/26* (2013.01); *B01D 3/346* (2013.01); *B01D 5/006* (2013.01); *B01D 5/009* (2013.01); *B01D 53/1412* (2013.01); *B01D 53/1468* (2013.01); *B01D 53/1493* (2013.01); *B01D 53/18* (2013.01); *B01D 53/52* (2013.01); *B01D 53/78* (2013.01); *B01D 53/84* (2013.01); *C01B 17/167* (2013.01); *C01C 1/10* (2013.01); *C01C 1/28* (2013.01); *C02F 9/00* (2013.01); *C05F 3/00* (2013.01); *C05F 5/004* (2013.01); *C05F 9/00* (2013.01); *C05F 17/40* (2020.01); *C05F 17/60* (2020.01); *C05F 17/80* (2020.01); *B01D 2252/10* (2013.01); *B01D 2252/20* (2013.01);
(Continued)

(58) Field of Classification Search
CPC ...... C05F 3/00; C05F 3/04; C05F 9/00; C05F 11/00; C05F 5/00; C05F 5/004; C05F 17/40; C05F 17/60; C05F 17/80; C05C 11/00; C05C 3/00
See application file for complete search history.

(56) References Cited

U.S. PATENT DOCUMENTS 3,549,420 A    12/1970    Cunningham
3,920,419 A    11/1975    Schroeder et al.
(Continued)

OTHER PUBLICATIONS

International Search Report and Written Opinion in International Patent Application No. PCT/US21/25636, dated Jun. 29, 2021, in 18 pages.
(Continued)

*Primary Examiner* — Renee Robinson
(74) *Attorney, Agent, or Firm* — Duane Morris LLP

(57) ABSTRACT

Methods and systems for converting ammonium waste streams into certifiably Organic ammonium salts having a variety of uses in greenhouse gas-reducing activities are herein described. The resulting ammonium salt compositions can be used to enhance crop yield.

15 Claims, 6 Drawing Sheets

(51) Int. Cl.

| | |
|---|---|
| *C05F 3/00* | (2006.01) |
| *C05F 11/00* | (2006.01) |
| *C01C 1/28* | (2006.01) |
| *C05F 5/00* | (2006.01) |
| *C01B 17/16* | (2006.01) |
| *C02F 9/00* | (2006.01) |
| *B01D 3/26* | (2006.01) |
| *B01D 3/20* | (2006.01) |
| *B01D 5/00* | (2006.01) |
| *B01D 53/14* | (2006.01) |
| *B01D 53/18* | (2006.01) |
| *B01D 53/52* | (2006.01) |
| *B01D 53/84* | (2006.01) |
| *B01D 53/78* | (2006.01) |
| *B01D 3/34* | (2006.01) |
| *C01C 1/10* | (2006.01) |
| *C05F 9/00* | (2006.01) |
| *C05F 17/40* | (2020.01) |
| *C02F 1/20* | (2006.01) |
| *C02F 1/00* | (2006.01) |
| *C02F 1/04* | (2006.01) |
| *C02F 1/66* | (2006.01) |
| *C02F 101/32* | (2006.01) |
| *C02F 101/10* | (2006.01) |
| *C02F 101/16* | (2006.01) |
| *C02F 103/32* | (2006.01) |

(52) U.S. Cl.
CPC .............. *C02F 1/004* (2013.01); *C02F 1/04* (2013.01); *C02F 1/20* (2013.01); *C02F 1/66* (2013.01); *C02F 2101/101* (2013.01); *C02F 2101/16* (2013.01); *C02F 2101/322* (2013.01); *C02F 2103/32* (2013.01); *C02F 2301/046* (2013.01)

(56) References Cited

U.S. PATENT DOCUMENTS

| | | | |
|---|---|---|---|
| 7,909,995 B2 * | 3/2011 | Jiang | B01D 53/18 |
| | | | 210/206 |
| 8,236,535 B2 | 8/2012 | Medoff | |
| 8,470,065 B1 * | 6/2013 | Burnham | C05G 5/30 |
| | | | 71/11 |
| 9,388,088 B2 | 7/2016 | Young et al. | |
| 9,643,895 B2 | 5/2017 | Morash et al. | |
| 2005/0086987 A1 | 4/2005 | Shetty | |
| 2006/0130546 A1 | 6/2006 | Beaton et al. | |
| 2011/0177559 A1 | 7/2011 | Medoff et al. | |
| 2012/0118035 A1 | 5/2012 | Zhao | |
| 2012/0201947 A1 | 8/2012 | Stuart | |
| 2013/0133386 A1 | 5/2013 | Baker et al. | |
| 2014/0033776 A1 | 2/2014 | Josse | |
| 2014/0144195 A1 * | 5/2014 | Callendrello | C05C 9/00 |
| | | | 60/39.12 |
| 2014/0260464 A1 | 9/2014 | LeSueur et al. | |
| 2016/0304409 A1 | 10/2016 | Evans | |
| 2017/0233301 A1 | 8/2017 | Sharma | |
| 2018/0245102 A1 | 8/2018 | Lloyd | |

OTHER PUBLICATIONS

Gür, Turgut M. "Comprehensive review of methane conversion in solid oxide fuel cells: prospects for efficient electricity generation from natural gas." Progress in Energy and Combustion Science 54 (2016): 1-64.

PCT International Search Report and Written Opinion for PCT/US2021/025636 dated Jun. 29, 2021.

* cited by examiner

ORGANIC AMMONIUM COMPOSITIONS AND METHODS OF THEIR USE AND MAKING

RELATED PATENT APPLICATIONS

This application claims benefit to U.S. Provisional Application No. 63/005,093, filed Apr. 3, 2020, and is incorporated herein by reference in its entirety.

FIELD OF THE INVENTION

This invention relates to methods of, and systems for converting liquid organic waste streams to certifiably Organic ammonium salts, and the compositions produced thereby. In particular, this invention relates to a process involving air-assisted steam-stripping, followed by scrubbing with an organic acid to produce a concentrated liquid ammonium product acceptable for use in organic agriculture.

BACKGROUND

The following includes information that may be useful in understanding the present invention. It is not an admission that any of the information, publications or documents specifically or implicitly referenced herein is prior art, or essential, to the presently described or claimed inventions. All publications and patents mentioned herein are hereby incorporated by reference in their entirety.

Global food production relies on fertile soils, which are a finite resource, requiring protection and efficient use by farmers producing food sources for animal and human consumption. Crops require fertile soils to sustain food production. Fertile soils must present necessary nutrients to crops for the crops to grow and yield productive food types. Often, after successive harvests, the concentration of nutrients in soils is reduced, resulting in poor crop quality that often must be ameliorated by the addition of exogenous fertilizers. One of the primary components in fertilizers is nitrogen in a form plants can easily uptake. Thus, nitrogen sources are an important component of plant fertilizers.

One source of nitrogen is in high-nitrogen wastewater streams. Wastewater from various organic industrial, agricultural, and municipal sources have nutrients that are separable to allow for recover and downstream water purification.

Anaerobic digestion (AD) is a common biological wastewater treatment technology which reduces biological oxygen demand (BOD), partially mineralizes organic nutrients (e.g. proteins) to inorganic forms (e.g. ammonia) and generates usable methane gas. However, most nutrients remain in the liquid effluent requiring either further treatment or careful utilization of the dilute effluent stream to ensure responsible environmental protection. AD is also susceptible to ammonia toxicity at low concentrations, often contributing to unreliable operation.

SUMMARY

The inventions described and claimed herein have many attributes and aspects including, but not limited to, those set forth or described or referenced in this Brief Summary. It is not intended to be all-inclusive and the inventions described and claimed herein are not limited to or by the features or embodiments identified in this Brief Summary, which is included for purposes of illustration only and not restriction.

This disclosure relates to a method of separation and isolation of nitrogen from high-nitrogen wastewater streams in a form amenable for plant uptake, especially in certifiably Organic agriculture.

Described herein is a process to selectively remove and concentrate ammonia or ammonium salts from diverse organic waste streams in high purity and yield, producing a non-synthetic ammonium fertilizer suitable for use in organic agriculture. The process can be applied to a diversity of ammonium containing organic wastes, does not require pH adjustment prior to stripping, and has been designed to minimize foaming which would hinder commercial adoption. In some aspects, the process involves the use of weak acids, specifically weak carbon-organic acids, in an ammonia scrubbing column to scrub ammonium from an ammonia vapor stream. The soluble liquid ammonium salts produced can be blended with other organic fertilizers to produce a nitrogen-enriched fertilizer with both slow- and fast-release nitrogen compounds that stimulate biological growth in the soil and improve plant heath. The blended nitrogen-enriched product is stable and provides pathogen resistance at near neutral pH due to a high ammonium salt content. The use of weak carbon-organic acids enables the product to be certified Organic when the carbon-organic acid is from a non-synthetic (biological) source.

In some aspects, this disclosure provides for a process for producing an ammonium salt composition from liquid organic waste streams comprising ammonium, the process comprising the steps of:

(a) providing a liquid organic waste stream comprising dissolved ammonium (ammonium waste stream), (b) optionally separating biogas from the ammonium waste stream to yield debiogased ammonium waste stream, wherein the biogas can include or exclude one or a plurality of gases selected from: methane ($CH_4$), carbon dioxide ($CO_2$), hydrogen sulfide, ($H_2S$) and hydrogen ($H_2$), (c) optionally, removing solids from the ammonium waste stream to yield solids-depleted ammonium wastewater and isolated solids, (d) stripping ammonia gas from the ammonium waste stream, debiogased ammonium waste stream, or solids-depleted ammonium wastewater by a process of:

(i) heating the ammonium waste stream, debiogased ammonium waste stream, or solids-depleted ammonium wastewater to a temperature above a temperature selected from 50 C.° to 90 C°, (ii) distilling the ammonia gas released from the heated ammonium swaste stream, debiogased ammonium waste stream, or solids-depleted ammonium wastewater through a distillation column using a downflow of the ammonium wastewater and upward stripping gas to yield separated ammonia gas and deammonified wastewater, (e) delivering the separated ammonia gas to an ammonium scrubber comprising a bottom inlet gas port and a top vent gas port, and (f) scrubbing ammonium from the ammonia gas in a packed bed vessel to yield an aqueous ammonium salt solution and a vent gas by presenting a certifiably Organic acid solution into the packed bed vessel which traverses in a first direction through the packed bed vessel countercurrent to ammonia gas delivered to the bottom of the packed bed vessel, wherein said ammonia gas traverses through the packed bed vessel in a second direction, wherein the first direction and second directions are oriented in opposite directions.

In some aspects, the process further comprises step: (g) delivering the aqueous ammonium salt solution into a storage tank.

In some aspects, step (a) providing a liquid organic waste stream comprising dissolved ammonium (ammonium waste stream) further comprises adding exogenous base to the liquid organic waste stream. The exogenous base can be selected from NaOH, KOH, Ca(OH)$_2$, NaHCO$_3$, Na$_2$CO$_3$, or combinations thereof. The exogenous base raises the pH of the liquid organic waste stream. In some aspects, no exogenous base needs to be added to adjust the pH of the ammonium waste stream, for example, if sufficient CO$_2$ is present in the ammonium waste stream following anaerobic digestion.

In some aspects, the liquid organic waste stream (ammonium waste water) can be selected from: those generated at dairy, swine, and other animal feeding operations; slaughter and rendering facilities; municipal and industrial wastewater treatment facilities, and organic waste generating industries which utilize aerobic digestion and/or fermentation.

In some aspects, the process can further comprise a step of blending the aqueous ammonium salt solution with a high-nutrient plant food into a nitrogen-enriched composition, wherein the ammonium salt solution can be optionally dried before blending with said high-nutrient plant food. In some aspects, the high-nutrient plant food can be selected from inorganic fertilizer or organic fertilizer. The organic fertilizer can be selected from fresh food waste hydrolysate, bat guano, fish emulsion, bone meal, blood meal, soy isolate, corn steep liquor (liquid or powder), seaweed, composts, molasses or vinasse, dunder, agricultural and food processing residues animal manure, and composted, hydrolyzed, or fermented combinations thereof. In some aspects, the high-nutrient plant food can be in liquid, wet, or dried form. In some aspects, the high-nutrient plant food can be diluted with an exogenous aqueous solution to reduce the viscosity, or improve the flow of, the resulting diluted high-nutrient plant food.

In some aspects, the stripping gas can be selected from compressed air, steam, compressed nitrogen, argon, helium, carbon dioxide, carbon monoxide, hydrogen, or other inert gases, and combinations thereof.

In some aspects, step (c) removing solids from the ammonium waste stream to yield solids-depleted ammonium wastewater and isolated solids can be performed using a coarse screen filter. In some aspects, the coarse screen filter can be a 20 mesh filter.

In some aspects, the certifiably Organic acid solution can be prepared by a process comprising:
(1) introducing a suitable certifiably Organic acid in dry or wet form, allowed for use in organic agriculture, into an acid makeup station,
(2) optionally if a dry acid is used, adding water to the dry organic acid to yield a liquid acid solution,
(3) agitating the acid source to yield a homogenous acid solution, and
(4) optionally, heating the acid solution to increase the solubility of the organic acid in solution.

In some aspects, the acid solution can comprise a certifiably Organic acid selected from: citric, malic, lactic, acetic, formic, oxalic, uric, myristiric, tartaric, ascorbic, humic, fulvic, camphorsulfonic, folic, fumaric, gallic, glycolic, lipoic, malonic, salicylic, sorbic, succinic, thioglycolic, thioacetic, propionic, butyric, sorbic, caproic, sulfuric, nitric, and phosphoric. The sulfuric, nitric, or phosphoric acids can be produced by non-synthetic, biological methods (e.g., natural mined sources). In some aspects, the acid solution is certifiably Organic. In some aspects, the acid solution is a biologically produced acid. In some aspects, acid solution comprises an acid which has a pKa of between 1.0 and 6.5. In some aspects, the pKa of the acid is between 1.5 and 5.5. In some aspects, the pKa of the acid is 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4 or 6.5, or between any of the aforementioned values. In some aspects, the sulfuric, nitric, or phosphoric can be produced from mined sources. The inventors have recognized that certifiably Organic acids can be used to produce certifiably Organic ammonium salt solutions for use in Organic agriculture. In some aspects, the pH of the acid solution can be from 3 to 6, inclusive.

In some aspects, the deammonified wastewater of step (d)(ii) can be recycled and introduced back into the ammonium wastewater source.

In some aspects, no foaming occurs during step (d) stripping ammonia gas from the ammonium waste stream. Foaming is a troublesome side effect of certain types of distillation processes which can reduce and/or inhibit overall process efficiency. The inventors have surprisingly discovered that the use of bubble-cap trap distillation columns reduces the foaming incidence during the stripping ammonia gas from the ammonium waste stream step.

In some aspects, the biogas produced in step (b) can be further processed into an organic sulfuric acid source by a process comprising:
(X) delivering the biogas to a biological sulfur scrubber,
(Y) adding a gas comprising air and/or oxygen to the biogas or sulfur scrubber vessel, and
(Z) scrubbing H$_2$S from the biogas using the aqueous stripping solution to form an aqueous sulfuric acid solution and desulfurized biogas.

In some aspects, the resulting sulfuric acid solution made by the aforementioned process can be added to the organic acid solution of step (f).

In some aspects, the aqueous scrubbing solution can further comprise a biological scrubbing agent. The biological scrubbing agent can be selected from aqueous solutions of amines, (i.e. mono-, di- or tri-ethanolamine) or aqueous solution of alkaline salts, (i.e. sodium, potassium and calcium hydroxides).

In some aspects, the desulfurized biogas can be recirculated into the system for use as an energy source for one or a plurality of unit operation steps in the system. In some aspects, the recirculated desulfurized biogas can be used to heat the ammonium wastewater of step (d)(i). In some aspects, the recirculated desulfurized biogas can be used to heat the ammonia stripper or the sulfur scrubber. In some aspects, the recirculated desulfurized biogas can be used as a fuel cell input to generate electricity, as described in Progress in Energy and Combustion Science, Vol. 54, May 2016, Pages 1-64, incorporated herein by reference.

In some aspects, this disclosure provides for the organic sulfuric acid solution produced by the methods described herein.

In some aspects, step (d) stripping ammonia gas from the ammonium waste stream, is performed with no pH adjustment prior to, or during the step.

In some aspects, step (d)(ii) can further comprise collecting the ammonia gas using a condenser column.

In some aspects, the distillation column can further comprise a bubble-cap tray column which further comprises tray risers to enforce unidirectional liquid flow.

In some aspects, the total nitrogen content of the aqueous ammonium salt solution produced by the methods described herein, before dilution or concentration of said ammonium salt solution, can range from 4 to 12% (w/w).

In some aspects, the ammonium wastewater can be a substantially homogeneous solution. The solids content in the ammonium wastewater can be less than 30%, less than 20%, less than 10%, or less than 5%. The ammonium wastewater can be in the form of a dried or semi-dry solid which is reconstituted with exogenous liquid comprising water to achieve any of the aforementioned solids content concentrations.

In some aspects, when the ammonium wastewater is fresh food waste hydrolysate, the fresh food waste hydrolysate can be made by a process involving grinding fresh food waste to produce a ground slurry, heating and incubating the ground slurry with one or more selected enzymes with constant agitation and shear, pasteurizing the incubated mixture to produce a hydrolysate, optionally reducing the fats content in the hydrolysate aqueous phase, optionally reducing the solids content in the hydrolysate, and emulsifying the hydrolysate to yield the fresh food waste hydrolysate.

In some aspects, during step (f), the pH and/or conductivity can be monitored. The pH and/or conductivity can be outside of a selected range, additional organic acid can be introduced into the packed bed vessel. The pH of the aqueous ammonium salt solution can be from 4.1 to 8.0, or from 4.2 to 6.8. In some aspects, the pH of the aqueous ammonium salt solution can be less than 6.8.

In some aspects, the deammonified wastewater can comprise an ammonium concentration of less than 30 mg N/L. The process of claim 1, wherein the deammonified wastewater can comprise a nitrate concentration of less than 9 mg N/L.

In some aspects, the aqueous ammonium salt solution made by the processes described herein can be further concentrated by removal of a selected amount of water.

In some aspects, this disclosure provides for the ammonium salt solution, or dired ammonium salt, produced by the methods described herein. The ammonium salt can be independently used as a fertilizer component or blended with a high-nutrient plant food.

In some aspects, this disclosure provides for a nitrogen-enriched composition comprising the ammonium salt solution described herein and a high-nutrient plant food. The high-nutrient plant food can be selected from inorganic fertilizer or organic fertilizer. The organic fertilizer can be selected from fresh food waste hydrolysate, bat guano, fish emulsion, bone meal, blood meal, animal manure, soy isolate, corn steep liquor (liquid or powder), seaweed, composts, molasses or vinasse, dunder, agricultural and food processing residues and hydrolyzed, composted, or fermented combinations thereof. The inorganic fertilizer can be selected from Grower's standard, urea, ammonium phosphate, ammonium sulfate, ammonium nitrate, potassium nitrate, potassium sulfate, potassium phosphate, potassium chloride (potash), triple superphosphate, magnesium sulfate (Epsom salts), and combinations thereof.

In some aspects, this disclosure provides for a method for increasing crop yield, the method comprising:
(a) providing a nitrogen-enriched composition as described herein or an aqueous ammonium salt solution as described herein;
(b) contacting the provided nitrogen-enriched composition to a plant or plant component;
(c) periodically administering water to the crops; and
(d) exposing the crops to air and a light source for a period of more than two weeks.

In some aspects, the plant component can be selected from: root, leaves, stems, fruits, flowers, or stalks. The water can be administered once, twice, or three times every day, two days, three days, four days, five days, six days, or seven days, over a period of two weeks. In some aspects, the crop yield can be increased by over 10% relative to a nitrate fertilizer alone.

In some aspects, this disclosure provides for a system for producing organic ammonium salt solution comprising:
(a) an ammonium wastewater vessel comprising an inlet port, optionally a recycled deammonified wastewater inlet port, a biogas outlet vent port, optionally an agitation means, and an outlet port coupled to the inlet port of an ammonia stripper,
(b) an ammonia stripper comprising an inlet port from the ammonium wastewater blending vessel, one or a plurality of stripping gas inlet ports, a deammononified wastewater outlet port, a distillation column which can be configured to receive fluids from the inlet port of the ammonium wastewater blending vessel at the top of the distillation column and can also be configured to receive stripping gas through the one or plurality of stripping gas inlet ports, a heating means to heat the ammonia stripper to a selected temperature range, and an ammonia gas outlet port which can be coupled to an inlet port of an ammonia scrubber,
(c) an ammonia scrubber comprising an inlet ammonia gas port, a vent gas outlet port, an inlet organic acids port, an aqueous ammonia salt solution outlet port, and a packed bed vessel configured to receive ammonia gas through the inlet ammonia gas port and organic acids through the inlet organic acids port and to vent excess gasses produced by the process through the outlet gas port and to release aqueous ammonia salt solution through the aqueous ammonia salt solution outlet port, and a heating means to heat the ammonia scrubber to a selected temperature range, and
(d) an aqueous ammonia solution vessel comprising an inlet aqueous ammonia solution coupled to the aqueous ammonia salt solution outlet port of the ammonia scrubber, and optionally an organic fertilizer blending outlet port.

In some aspects, the distillation column in the system described herein can be selected from a bubble cap tray column, packed bed column, or flooded tray column.

In some aspects, the system can further comprise a solids removal apparatus interposed between the outlet port on the ammonium wastewater blending vessel and the inlet port of the ammonia stripper. In one aspect the solids removal apparatus comprises a removable mesh screen, wherein solid particles over a selected size range are collected on the mesh screen and prevented from entering the inlet port of the ammonia stripper.

In some aspects, the deammonified wastewater outlet port on the ammonia stripper can be coupled to the recycled deammonified wastewater inlet port of the ammonium wastewater blending vessel.

In some aspects, the system can further comprise:
(e) an organic fertilizer blender comprising an aqueous ammonia solution vessel inlet port, a high-nutrient plant food inlet port, an agitation means for blending the high-nutrient plant food with the aqueous ammonia solution, and an outlet port.

In some aspects, high-nutrient plant food can enter the high-nutrient plant food inlet port. Such high-nutrient plant food can be selected from inorganic fertilizer or organic fertilizer. The organic fertilizer can be selected from fresh food waste hydrolysate, bat guano, fish emulsion, bone meal, blood meal, animal manure, soy isolate, corn steep liquor (liquid or powder), seaweed, composts, molasses or vinasse, dunder, agricultural and food processing residues and hydrolyze, composted, or fermented combinations thereof. The inorganic fertilizer can be selected from Grower's standard, urea, ammonium phosphate, ammonium sulfate, ammonium nitrate, potassium nitrate, potassium sulfate, potassium phosphate, potassium chloride (potash), triple superphosphate, magnesium sulfate (Epsom salts), and combinations thereof.

In some aspects, the system can further comprise:
(f) an acid makeup vessel comprising an acid source inlet port for receiving organic acids, a water inlet port for receiving water, a means for mixing the organic acids and water, optionally a heating means to heat the acid makeup vessel to a selected temperature range, optionally a bio-sulfuric acid inlet port, and an outlet port coupled to the inlet organic acids port of the ammonia scrubber (c).

In some aspects, the system can further comprise:
(g) a sulfur scrubber comprising a biogas inlet vent port coupled to the biogas outlet vent port of the ammonium wastewater blending vessel, an oxygen and/or air gas inlet port, one or a plurality of packed bed bio-trickling filters which receive the biogas, oxygen and/or air to separate the biogas into aqueous sulfur compounds and desulfurized biogas, a bio-sulfuric acid outlet port which can be coupled to the bio-sulfuric acid inlet port of the acid makeup vessel, and a temperature control means to heat or cool the sulfur scrubber to a selected temperature range.

In some aspects, this disclosure provides for the ammonium salt solution produced by any of the processes described herein.

In some aspects, this disclosure provides for a method of reducing pathogen levels in organic fertilizer, the method comprising the steps contacting an aqueous solution comprising ammonium salt with an organic fertilizer to produce a blended pathogen-free nitrogen-enriched organic fertilizer. In some aspects, the aqueous solution comprising ammonium salt comprises from 4 to 11% N (w/w).

BRIEF DESCRIPTION OF FIGURES

FIG. 3A shows the ammonium content of the produced aqueous ammonium solution at the indicated NaOH input concentrations as a function of column temperature.

FIG. 3B shows the alkalinity of the produced aqueous ammonium solution at the indicated NaOH input concentrations as a function of column temperature.

FIG. 3C shows the conductivity of the produced aqueous ammonium solution at the indicated NaOH input concentrations as a function of column temperature.

FIG. 3D shows the pH of the produced aqueous ammonium solution at the indicated NaOH input concentrations as a function of column temperature.

DETAILED DESCRIPTION

Definitions

Figure 1:
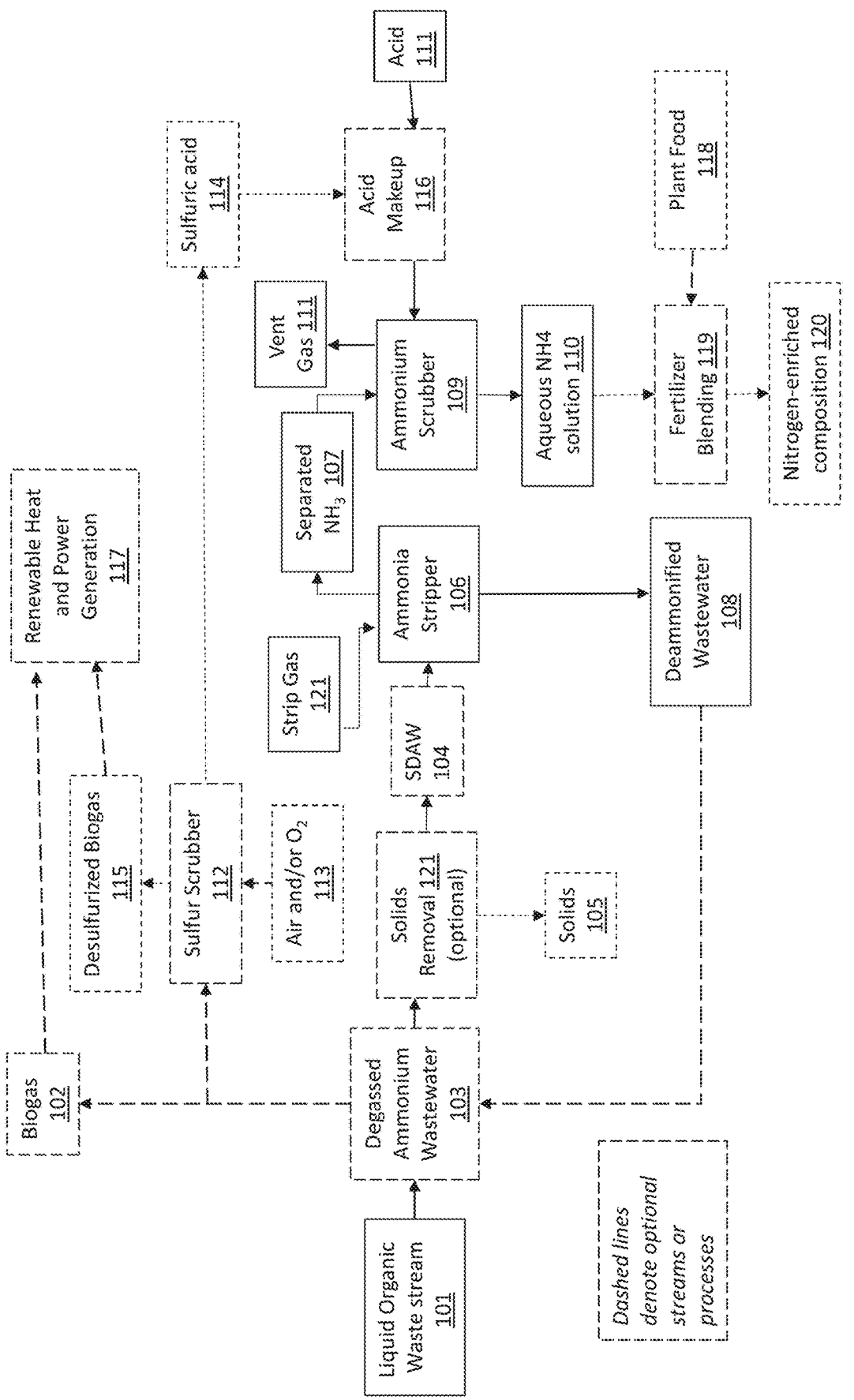
FIG. 1 is a flowchart showing the process steps involved in one embodiment of this disclosure.

As used herein the term "liquid organic waste streams," or "ammonium waste stream," or "ammonium wastewater," refers to aqueous solutions which are the output of a previous process step which comprise dissolved ammonium salts or dissolved ammonia gas. Liquid organic waste streams can include or exclude liquid effluents from methane producing anaerobic digesters processing food waste, industrial waste, manures (animal or human), municipal wet wastes, fertilizer runoff, and fresh food waste hydrolysate as described herein. In some embodiments, the methane producing anaerobic digesters processing food waste can include or exclude bacterial-catalyzed food waste digesters. In some embodiments, the methane producing anaerobic digesters can include or exclude those described in U.S. Pat. App. No. US 2012/0201947, U.S. Pat. App. No. US 2011/0177559, U.S. Pat. App. No. US 2005/0086987, U.S. Pat. App. No. US 2006/0130546, U.S. Pat. App. No. US 2014/0260464, U.S. Pat. App. No. US 2016/0304409 or U.S. Pat. App. No. US 2013/0133386, each of which are herein incorporated by reference in their entirety. In some embodiments, the ammonium waste stream can include or exclude dairy digester wastes, alcohol fermentation wastes, rendering facilities wastes, lagoon water, and landfill leachate. In some embodiments, the ammonium wastewater can be from metal finishing wastes which comprise dissolved ammonium salts.

As used herein, the term "dissolved ammonium salts" refers to ions of $NR_4^+$, wherein each R is independently selected from $C_{1-4}$ alkyl, acetyl, aryl, alkoxy, or Hydrogen.

As used herein, the term "fresh food waste" refers to a recyclable stream selected from: fresh food recyclables, blood meal, bakery goods, spent poultry, pomace, culled fruits and/or vegetables, and mixtures thereof. The fresh food waste comprises fats to produce lipids which act as chemical emulsifiers, amino acids which are sulfur and nitrogen sources, and polysaccharides which are sources of sugars.

As used herein, the term "crop yield" refers to a measurement of the amount of a crop that was harvested per unit of land area. Crop yield can also refer to the actual seed generation from the plant. The unit by which the yield of a crop is measured can be kilograms per hectare, bushels per acre, or tons per acre.

As used herein, the term "course screen" refers to a screen or mesh to separate pasteurized solids from the liquid pasteurized hydrolysate, and can include a variety of screening techniques. In some embodiments the course screen can be a mesh screen with pores having 18-60 mesh (a diameter of about 250 to about 1000 microns). In some embodiments, the course screen can be an 18 mesh screen with 1000 micron openings, 20 mesh screen with 841 micron openings, 25 mesh screen with 707 micron openings, 30 mesh screen with 590-595 micron openings, 35 mesh screen with 500 micron openings, 40 mesh screen with 400 micron openings, 45 mesh screen with 354 micron openings, 50 mesh screen with 297 micron openings, or 60 mesh screen with 250 micron openings, or other commercially available coarse screening technologies. A course screen may have opening so 250 microns or larger, or between any two of the recited sizes. In some aspects, the filter or mesh can be made of metal, plastic, glass or ceramic. In some aspects, the plastic can be nylon.

As used herein, the term "fine screen" refers to a screen or mesh with pores having about 35 to 400 mesh (a diameter of about 500 to 27 microns). The fine screen serves to i) increase particle surface area, thereby increasing the effectiveness of the enzymes used to produce the fresh food waste hydrolysate; ii) assure the ability of the pasteurized hydrolysate to pass easily through the farmer's drip lines, or other similar equipment; and iii) ensure the particle sizes are appropriate for metabolism by soil organisms once the fresh food waste hydrolysate blended with the aqueous ammonium solution can be delivered to the root zone. In some embodiments, the 30 mesh screen can be a vibrating screen. This separates the fresh food waste hydrolysate from particles too large to pass through the mesh, for example, particles having an average diameter larger than 590 microns. The fresh food waste hydrolysate passing through the first screen may then be further separated by filtering through a 200 mesh screen with an opening size of 74 microns. In some aspects, the incubated fresh food particles removed from the hydrolysate by screening through the 200 mesh screen have a diameter of greater than microns. In some aspects the screen may be a vibrating screen. In some embodiments the fine screen can be a mesh screen having 35 to 400 mesh may be used in the second screening step, for example, 35 mesh screen with 500 micron openings, 40 mesh screen with 400 micron openings, 45 mesh screen with 354 micron openings, 50 mesh screen with 297 micron openings, or 60 mesh screen with 250 micron openings, 70 mesh screen with 210 micron openings, 80 mesh screen with 177 micron openings, 100 mesh screen with 149 micron openings, 120 mesh screen with 125 micron openings, 140 mesh screen with 105 micron openings, 170 mesh screen with 88 micron openings, 200 mesh screen with 74 micron openings, 230 mesh screen with 63 micron openings, 270 mesh screen with 53 micron openings, 325 mesh screen with 44 micron openings or 400 mesh screen with 37 micron openings, or other commercially available fine screening technologies. The solid particles separated by the fine screen, having a diameter between about 74 microns and about 590 microns, may be recycled as a feedstock to be digested in the next batch. A fine screen may have a mesh size between any two of the recited mesh sizes. In some aspects, the filter or mesh can be made of metal, plastic, glass or ceramic. In some aspects, the plastic can be nylon.

As used herein, the term "grower's standard" refers to a urea, nitrate, or ammonium based fertilizer and other fertilizing regime with nutrient requirements standardized for a given crop, in current use by the grower.

As used herein, the term "fresh food waste hydrolysate" refers to a product of the digestion of a selected food waste stream with enzymes. In some embodiments, the enzymatic digestion is performed under aerobic conditions. The liquid may contain small particles and/or oil droplets depending on the grinders used and the mesh screen used to separate larger particles from the hydrolysate, as described herein. The fresh food waste hydrolysates can include or exclude any of the hydrolysates described in U.S. Pat. Nos. 9,643,895 or 9,388,088, herein incorporated by reference in their entirety.

As used herein, the term "ground slurry" refers to the mixture that is formed after the first grinding step, which may be a mixture of particles and liquid.

As used herein, the term "incubated ground slurry" refers to the mixture that is incubated at elevated temperature formed after the first grinding step, which may be a mixture of particles and an hydrolysate.

As used herein, the term "particles" refers to the particles obtained from the separated slurry which are separated from the hydrolysate.

As used herein, the term "incubated hydrolysate" refers to the liquid hydrolysate in the ground slurry which is separated from the particles.

As used herein, the term "enzyme combination" refers to two or more selected enzymes added to ground slurry, the processed hydrolysate, and/or the incubating mixture. The enzymes in an enzyme combination may be mixed together before addition to the ground slurry, the processed hydrolysate, and/or the incubating mixture, or they may be added separately to the ground slurry, the processed hydrolysate, and/or the incubating mixture.

As used herein, the term "high-shear mixer" refers to an apparatus that disperses or transports one phase or ingredient (liquid, solid, or gas) into a main continuous phase (liquid), with which it would normally be immiscible.

As used herein, the term "agitation" means a stirring action intended to increase the collisions between the components in contact with the agitation means. In some embodiments, the components in contact with the agitation means are enzyme molecules and food particles. In some embodiments, agitation is produced by rotating mixing blades in the incubation vessel, at a rate of 1 to $10^4$ $sec^{-1}$.

As used herein, the term "shear" means a cutting action that reduces food particle size, increasing its surface area, and therefore, its interaction with enzyme molecules. In some embodiments, high shear is created by circulating the slurry through a high speed, high shear mixer throughout the digest at rates in the range of $10^5$-$10^6$ $sec^{-1}$ or more.

Ammonium Generation and/or Isolation from Liquid Organic Waste Stream Comprising Dissolved Ammonium Schroeder et al. (U.S. Pat. No. 3,920,419) refers to a method for removing ammonia from ammonia containing liquors using a steam distillation system. This general method is commonly used, but only references strong synthetic acids such as sulfuric, nitric, and phosphoric, to form their respective ammonia salts. Raising the pH of the wastewater with a caustic solution up to a pH of 10.5 is often required to improve ammonia release during stripping. In contrast, the inventors have developed a process that does not involve addition of caustic solution, utilizes non-synthetic acids (in some embodiments, certified Organic acids), and does not necessarily require pH monitoring.

Ammonia removal and purification from AD systems and other technologies that generate organic ammonium in their wastewater effluent can be challenging and inefficient as effluents contain high concentrations of other suspended and dissolved nutrients. In development efforts conducted by the inventors, steam-only distillation was found to be problematic due to a tendency for foaming at elevated temperatures.

Chemical adjustment and anti-foam agents were found to have high operations costs due to high dosage requirements. Membrane filtration was found to eliminate the tendency to foam but was extremely expensive. Less energy-intensive filtration methods, including use of diatomaceous earth and various fabrics, are ineffective. Coagulants require high dosage rates that would be cost prohibitive. In summary, a practical method for solids separation and/or dewatering to recover high purity organic ammonium was not available prior to this invention.

Ammonia distillation and recovery by scrubbing with sulfuric acid has been described by several others to produce ammonium sulfate, an agricultural commodity for conventional fertilizer use. There are no commercially available non-synthetic sulfuric acid sources, and therefore ammonium sulfate produced in this manner would not be acceptable for use in organic agriculture.

Morash and LeJeune describe a method for producing nutrient rich compositions from food waste streams using enzymatic hydrolysis technology (U.S. Pat. No. 9,416,062) to produce an organic fertilizer where nitrogen is primarily present in the soluble organic (protein and amino acid) forms. Organic ammonium, produced as described here, can optionally be blended with fertilizers of this nature to provide a balanced nitrogen profile including both fast and slow release characteristics, or marketed as a stand-alone product.

Liquid Organic Waste Stream Comprising Dissolved Ammonium (Ammonium Waste Stream)

The liquid organic waste stream comprising dissolved ammonium can be any ammonium-containing wastewater as might be found in agricultural, industrial, municipal, or other settings. Liquid organic waste streams can include or exclude anaerobic digesters or fermenters treating organic sources of food waste, animal waste, human waste, industrial waste, agricultural wastes, and fresh food waste hydrolysate. More specifically, liquid organic waste stream may include or exclude anaerobic digestates treating pre- or post-consumer food waste; dairy, swine, or poultry manures; agricultural residues including stovers, stems, leaves, prunings, crop waste; greenwaste; separated or unseparated organic fractions of municipal solid waste; food processing wastes including wastewaters, whey, spoiled beverage materials, spent wine must, and spent beer mash. Animal and food processing facilities such as slaughterhouses and renderes also generate ammonium containing waste streams. Liquid organic waste stream streams can include or exclude output liquid effluents from anaerobic digesters processing food waste, industrial waste, manures (animal or human), municipal wet wastes, fertilizer runoff, and fresh food waste hydrolysate as described herein. In some embodiments, the ammonium waste stream can include or exclude dairy digester wastes, alcohol fermentation wastes, rendering facilities wastes, lagoon water, and landfill leachate. In some embodiments, the ammonium wastewater can be from metal finishing wastes which comprise dissolved ammonium salts. In some embodiments, the liquid organic waste stream can include or exclude petroleum refinery wastewater, blue crab processing wastewater, acetylene purification wastewater, and soda ash wastewater. The ammonium wastewater can be waste water from any technology which uses ammonium salts, has ammonium salts as a byproduct, or intakes atmospheric nitrogen and converts it to ammonium salt as a byproduct. There is no lower limit on ammonium concentration which the technology can be applied, although more favorable economics are achieved with higher ammonium concentrations. In some embodiments, ammonium concentrations can be above 1000 mg/L, with more preferably concentrations above 4000 mg/L.

In some embodiments, the liquid organic waste stream is reduced or cleared of solids to avoid plugging or fouling of downstream equipment such as pumps and columns Solids removal techniques are widely available and may include screening, filtering, centrifuging, sedimentation, coagulation, flotation, precipitation, etc. Screening methods can include use of a 20 mesh screen, or a coarse or fine screen as described herein.

In some embodiments, the liquid organic waste stream can be degassed so as to separate biogas. The separated biogas can be captured and utilized for energy conversion to thermal or electrical energy, which may be used to supply boilers, blowers, pumps, and other equipment as needed.

In some embodiments, biological sulfur scrubbing can be used to produce a sulfuric acid stream of biological origin to use as a scrubbing solution for ammonium recovery. Packed bed bio-trickling filters operate continuously at temperatures between 20-45 C and provide the benefit of removing potentially harmful sulfur gases from biogas prior to downstream use.

Process for Making Organic Ammonium Compositions

In some embodiments, ammonia stripping is performed using a distillation column which allows for separation of liquids and vapors through a series of stages. The design tested here utilizes a bubble-cap tray column with downflow distribution of liquids and upward air and steam flow. Stripping of the liquid removes carbon dioxide which increases the pH and improves stripping of ammonia. Overhead vapors are swept out of the column and delivered to the acid scrubber. The distillation column can be operated at temperatures ranging from 50-90 C, with desired range typically 80-90 C. Temperatures are adjustable and related to the operating vacuum pressure as controlled by a blower which draws air through the column ensures all vapors are captured and delivered to the scrubber. Preheating of the column liquid feed by heat exchange with the discharged liquid ensures efficient heat utilization. Increasing the pH of the liquid feed can help facilitate ammonia release.

In some embodiments, ammonia scrubbing can be performed in a packed-bed vessel where acid is pumped down through the bed countercurrent to vapors rising through the column. In some embodiments, ammonia scrubbing is performed with a spray tower bubble column, sparging, or trayed towers (plate columns). Trayed towers can further comprise bubble caps (with or without a tray riser), sieve trays, and valve trays. In the ammonia scrubbing process, ammonia is absorbed into the liquid phase and reacts with the acid to form ionized organic ammonium salts. Rather than strong acids, non-synthetic organic acids such as citric, acetic, or lactic can be used. In some embodiments, acid is recirculated through the scrubber column and fresh acid is added to maintain a pH setpoint. Ammonium salt solution is discharged based on overflow or a conductivity setpoint. In some embodiments, the pressure is monitored at the ammonia vapor input port and at the vent gas port so as to measure the pressure drop across the column. Evaporation or further dehydration of the ammonium product can be performed to increase the product nitrogen concentration or yield a dried form of the ammonium salt.

Desirable scrubber acid concentrations are as high as possible, subject to preventing crystallization. Acid solubility is temperature dependent and increases with temperature. Dry acids can be used and reconstituted in a heated pre-mix or saturation tank prior to injection. Clean water or a recycled wastewater stream with minimal solids and contaminants can be used for acid reconstitution.

In some embodiments, this disclosure relates to the process described in FIG. 1. Organic waste can be in the form of liquid, dried, or semi-dried organic waste, or can be reconstituted as a liquid organic waste stream or used in the original form. A liquid organic waste stream 101 comprises dissolved forms of ammonium ions ($NR_4^+$, wherein each R is independently selected from $C_{1-4}$ alkyl, acetyl, aryl, alkoxy, or Hydrogen) or dissolved ammonia gas. The liquid organic waste stream 101 is optionally degassed into biogas 102 and degassed ammonium wastewater 103. The biogas 102 can include or exclude one or a plurality of gases selected from: methane ($CH_4$), carbon dioxide ($CO_2$), hydrogen sulfide, ($H_2S$) and hydrogen ($H_2$). The biogas 102 can optionally be recirculated to be used for heat and/or power generation 117 to power one or a plurality of unit operations of the process. In some embodiments, the biogas 102 can be used as a fuel cell input to generate electricity. In some embodiments, the biogas 102 can be processed into organic sulfuric acid 114 via a process comprising delivering the biogas to a biological sulfur scrubber 112, adding a gas comprising air and/or oxygen 113 to the biogas 102 or sulfur scrubber vessel 112, then scrubbing $H_2S$ from the biogas 102 using an aqueous stripping solution to form an aqueous sulfuric acid solution 114 and desulfurized biogas which can be used for heat and/or power generation 117. The ammonium wastewater, either in the form of degassed ammonium wastewater 103 or the original liquid organic waste stream 101 can be optionally processed to remove solids in a solids-removal workstation 121 into isolated solids 105 and solids-depleted ammonium wastewater ("SDAW") 104. The liquid organic waste stream (ammonium waste stream) 101, solids-depleted ammonium wastewater 104, or degassed ammonium wastewater 103 is presented to an ammonia stripper 106 which heats the ammonium waste stream, debiogased ammonium waste stream, or solids-depleted ammonium wastewater to a temperature above a temperature selected from 50 C.° to 90 C°, injecting a stripping gas 121 in a counterdirection to the injected ammonium waste stream, debiogased ammonium waste stream, or solids-depleted ammonium wastewater, wherein the strip gas comprises air or steam, then distilling the separated ammonia gas 107 to yield deammonified wastewater 108. In some embodiments, the deammonified wastewater 108 can be supplemented to the liquid organic waste stream 101 or degassed ammonium wastewater 103 to further increase the overall ammonia stripping efficiency of the process. The separated ammonia gas 107 can be delivered to an ammonium scrubber 109 wherein the ammonia gas is reacted with an organic acid 111 which is optionally processed at an acid makeup workstation 116 to yield aqueous ammonium salt solution 110 and vent gas 111. In some embodiments, the aqueous ammonium salt solution 110 can be delivered to a storage tank or optionally blended at a fertilizer blending workstation 119 with high-nutrient plant food 118 to yield a nitrogen-enriched composition 120. In some embodiments, the nitrogen-enriched composition 120 is presented to a storage tank (not shown). In some embodiments, the aqueous salt solution 110 is presented to a storage tank (not shown). In some embodiments, the aqueous salt solution 110 is dried (not shown).

Figure 2:
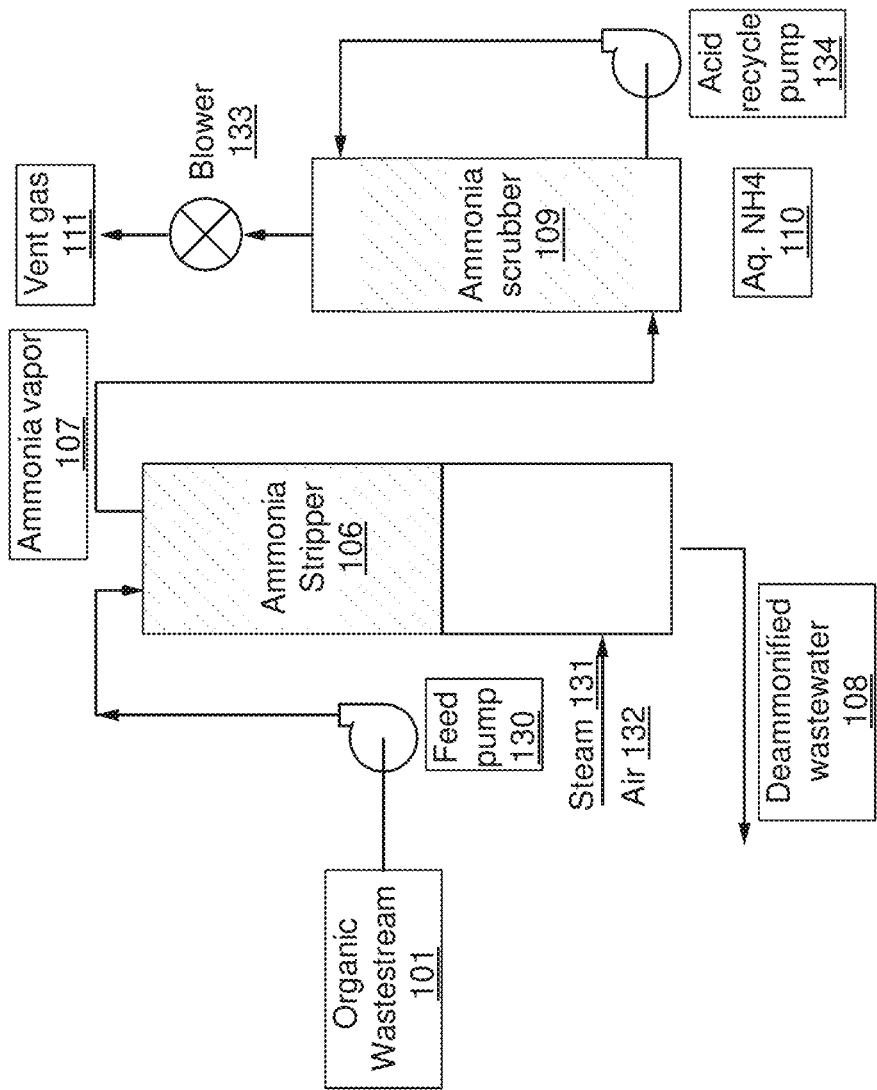
FIG. 2 is a flowchart showing one embodiment of the coupling between the ammonia stripper and the ammonia scrubber of this disclosure.
Figure 3B:
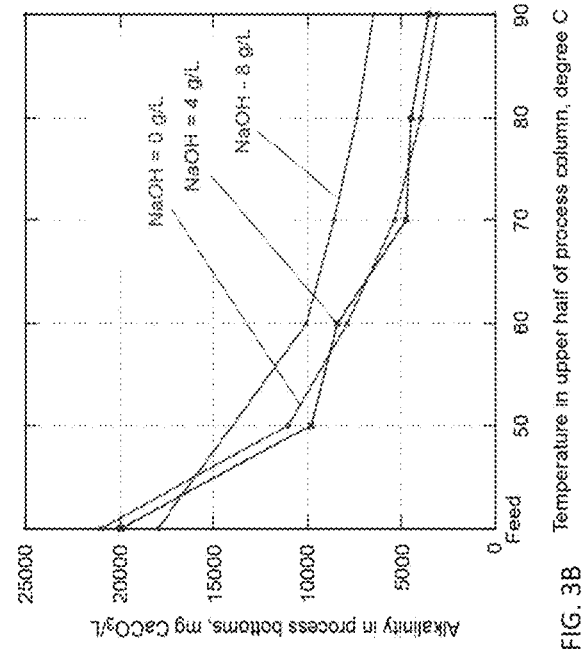
FIGS. 3A-3D show summary graphs of data collected during optimization testing of pilot distillation column at the indicated NaOH input concentrations for each parameter as a function of column temperature.
Figure 3D:
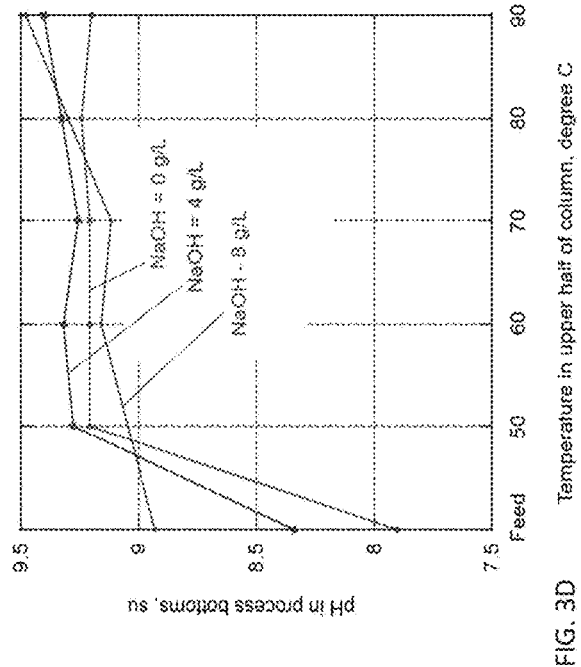
Figure 3A:
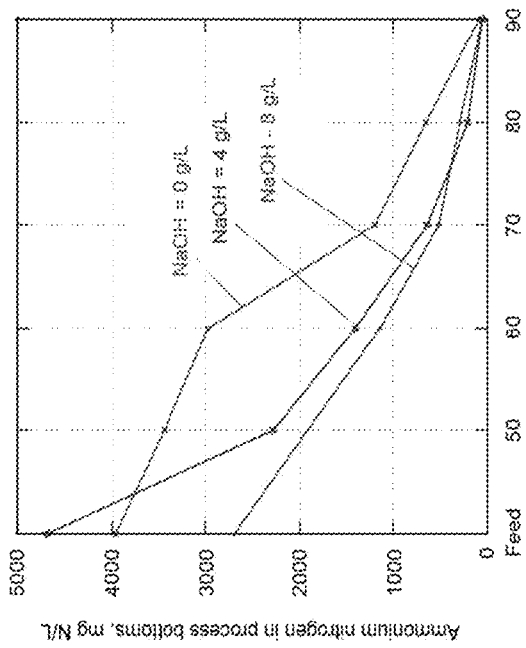
Figure 3C:
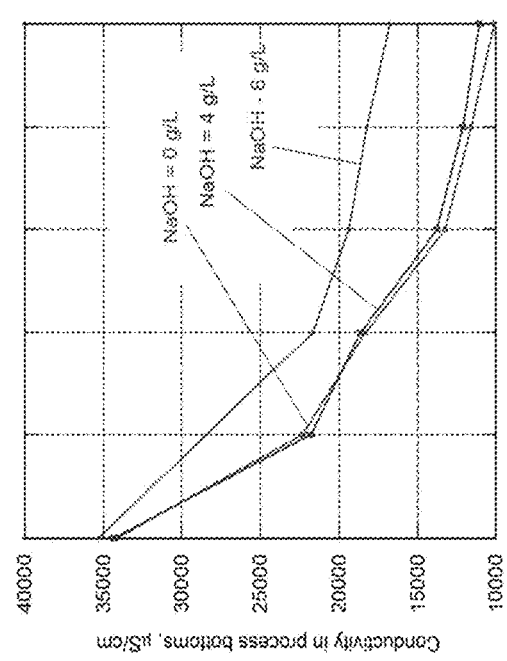

As shown in FIG. 2, in some embodiments, the coupling of the ammonia stripper 106 and the ammonia scrubber 109 utilizes the relative densities of ammonia, air, and steam to achieve a highly efficient ammonia scrubbing yield from the ammonium waste stream. The liquid organic waste stream 101 is delivered to the top of the ammonia stripper 106 via a feed pump 130. A stripping gas comprising steam 131 and air 132 is presented to the ammonia stripper 106 at or near the bottom of the ammonia stripper 106. The density of air is about 0.6 kg/m^3, the density of steam about 1.3 kg/m^3, and the density of ammonia is about 0.7 kg/m^3. The liquid organic waste stream (ammonium waste stream) interacts with the steam and delivery air to yield free ammonia vapor 107 and deammonified wastewater 108. The released ammonia vapor 107 exits the top of the ammonia stripper 106 and is delivered via a pump (not shown) to the bottom of the ammonia scrubber 109. ammonium scrubbing process is performed by presenting an (optionally organic) acid solution 111 into an ammonia scrubber 109 comprising a packed bed vessel, wherein the acid solution traverses in a first direction through the packed bed vessel countercurrent to ammonia vapor 107 delivered to the bottom of the packed bed vessel, wherein said ammonia vapor 107 (also referred to herein as ammonia gas) traverses through the packed bed vessel in a second direction, wherein the first direction and second directions are oriented in opposite directions. In some embodiments, the first direction is down, and the second direction is up. The ammonia gas 107 presented to the ammonia scrubber 109 reacts with liquid acid presented via an acid recycle pump 134 resulting in an aqueous ammonium solution 110 and vent gas 111 which is removed from the scrubber via a blower 133. Without being bound by theory, it is believed that the removal of the vent gas 111 drives the reaction of ammonia gas and aqueous acid solution to completion.

In some embodiments, the ammonia stripper 106 can be a tray stripper selected from Buflovak (Buflovak Systems, Buffalo, N.Y.), Koch Modular Systems distillation system (Koch Modular Systems, Paramus, N.J.), and Mueller Distillation column (Paul Mueller, Inc., Springfield, Mo.). In some embodiments, the ammonia scrubber 109 can be a packed-bed scrubber selected from Gulf Coast Environmental Systems wet scrubber (Conroe, Tex.), KCH Engineered Systems wet scrubber (Forest City, N.C.), and Tri-Mer Corporation wet scrubber (Owosso, Mich.). In some embodiments, the vent gas 111 can be extracted with a blower 133. In some embodiments, the blower 133, can be a blower pump obtained from Ametek Rotron, Gast Manufacturing, or Atlantic Blowers. In some embodiments, the feed pumps (not shown) which present each of the separate process units to the next processing station can be a centrifugal pump. The centrifugal pump can include or exclude a pump from a Gormann-Rupp Pump, Sulzer Pump, and Flowserve Pump. In some embodiments, the acid recycle pump 134 which presents the acid to the ammonia scrubber can be a peristaltic pump (not shown). The peristaltic pump can be obtained from Flowrox, Hayward-Gordon, or Graco. In some embodiments, the biogas 102 extracted from the organic waste stream 101 can be performed using a biotrickler and/or a degassifier, which can each be obtained from companies such as KCH Engineered Systems, Lantec, and Veolia.

In some embodiments, one or a plurality of condensers (not shown) and/or one or a plurality of reflux drums (not shown) can be interposed between the ammonia stripper 106 and the ammonia scrubber 109. The condenser and/or reflux drum increases the efficiency of converting gaseous ammonia to liquid ammonia before the liquid ammonia can be presented to the ammonia scrubber 109.

The inventors have surprisingly discovered that with the presence of sufficient amounts of $CO_2$ and alkalinity in the liquid ammonium waste stream, no pH adjustment is required during the stripping process, which is in contrast to conventional ammonia stripping processes which require pH adjustment to obtain sufficient yields of stripped ammonia. In some embodiments, the ammonia stripping step (d) stripping ammonia gas from the ammonium waste stream, debiogased ammonium waste stream is performed without the addition of pH adjustment.

In some embodiments, the system and/or process can further comprise one or a plurality of the following interposed between any of the foregoing described system components to further increase the ammonia production efficiency from the ammonium waste stream: Temperature Indicator, Level Controller, Variable Frequency Drive, Motor, Flow Controller, Pressure Controller, Solenoid, Analyzing Controller, and One-Way Valves.

Acids

The inventors have discovered that ammonia scrubbing using weaker non-synthetic organic acids (biologically produced acids) (e.g. citric, acetic, propionic, lactic, etc.) can be performed to generate a product allowable for use in organic agriculture ("certifiably Organic" fertilizer). Strong acids are generally from synthetic sources, and as such, when used in ammonia scrubbing systems do not yield certifiably Organic ammonium sources and thus cannot be used in organic agriculture.

As used herein, the term "carbon-organic acids" refers to carboxylic acids and phenols which have a pKa of the first ionization state of between 1.0 and 6.5. The carboxylic acids can be from organic sources (biologically produced acids). In some embodiments, the carboxylic acids (biologically produced acids) are produced via fermentation, bacterial production, and/or enzymatic reactions of carbon-organic compounds. In some embodiments, the carbon-organic acids are biologically produced carboxylic acids which have a pKa of between 1.0 and 5. Such carboxylic acids are well-known in the art (Perrin, D. D., Dissociation Constants of Organic Bases in Aqueous Solution, Butterworths, London, 1965; Supplement, 1972; Serjeant, E. P., and Dempsey, B., Ionization Constants of Organic Acids in Aqueous Solution, Pergamon, Oxford, 1979; Albert, A., "Ionization Constants of Heterocyclic Substances", in Katritzky, A. R., Ed., Physical Methods in Heterocyclic Chemistry, Academic Press, New York, 1963; Sober, H. A., Ed., CRC Handbook of Biochemistry, CRC Press, Boca Raton, Fla., 1968; Perrin, D. D., Dempsey, B., and Serjeant, E. P pKa Prediction for Organic Acids and Bases, Chapman and Hall, London, 1981; Albert, A., and Serjeant, E. P., The Determination of Ionization Constants, Third Edition, Chapman and Hall, London, 1984; O'Neil, M., Ed., The Merck Index, 14th Edition, Merck & Co., Whitehouse Station, N J, 2006).

In some embodiments, the acid 111 is a certifiably Organic acid. The certifiably Organic acid can include or exclude carbon-based organic acids. The certifiably Organic acid can include or exclude sulfuric, nitric, or phosphoric acids which are produced from mined sources and as such are certifiably Organic acids. In some embodiments, the acids are obtained from non-synthetic, biological methods (biologically produced acids). The non-synthetic, biologically produced acids can be selected from: citric, malic, lactic, acetic, formic, oxalic, uric, myristiric, tartaric, ascorbic, humic, fulvic, camphorsulfonic, folic, fumaric, gallic, glycolic, lipoic, malonic, salicylic, sorbic, succinic, thioglycolic, thioacetic, propionic, butyric, sorbic, or caproic acid. The certifiably Organic acid satisfies the requirements of United States government standards (as of 2019) for Certified Organics, as described herein.

In some embodiments, the acid makeup station comprises a heater. In some embodiments, when the input acid source is in a dried form, the acid and water are heated at a sufficient temperature so as to fully dissolve the acid, including up to saturation levels, in the water.

Certified Organic

In some embodiments, the produced ammonium salt solution can be certifiably Organic. In some embodiments, the acid is certifiably Organic.

For a composition to be certified as organic it must satisfy specific governmental standards. The governmental standards may vary from country to country. The term "certifiably Organic" as used herein, is intended to represent that the organic composition has satisfied the standards for being denoted as "Organic" in the United States.

In the United States, the United States Department of Agriculture (USDA) regulates Organic certification through a National Organic Program (NOP). To qualify to use the organic label, the requesting entity seeking organic certification must abide by a National List that is produced by NOP. The National List identifies what can and cannot be included in certified Organic products. Specifically, all non-synthetic (natural) materials are allowed, unless specifically prohibited and synthetic substances and ingredients and nonagricultural substances are prohibited unless specifically allowed.

As used herein, the term "certifiably Organic blended fertilizer" means an ingredient or product that may be used in certified Organic crop production in accordance with USDA National Organic Program standards, as described herein. Currently, 7 CFR 205.203 provides the practice standard for certified Organic crop production. The regulations under 7 CFR 205.203 provide the following:

(a) The farmer must select and implement tillage and cultivation practices that maintain or improve the physical, chemical, and biological condition of soil and minimize soil erosion.

(b) The farmer must manage crop nutrients and soil fertility through rotations, cover crops, and the application of plant and animal materials.

(c) The farmer must manage plant and animal materials to maintain or improve soil organic matter content in a manner that does not contribute to contamination of crops, soil, or water by plant nutrients, pathogenic organisms, heavy metals, or residues of prohibited substances. Animal and plant materials include:

(1) Raw animal manure, which must be composted unless it is:
  (i) Applied to land used for a crop not intended for human consumption;
  (ii) Incorporated into the soil not less than 120 days prior to the harvest of a product whose edible portion has direct contact with the soil surface or soil particles; or
  (iii) Incorporated into the soil not less than 90 days prior to the harvest of a product whose edible portion does not have direct contact with the soil surface or soil particles;

(2) Composted plant and animal materials produced through a process that:
  (i) Established an initial C:N ratio of between 25:1 and 40:1; and
  (ii) Maintained a temperature of between 131° F. and 170° F. for 3 days using an in-vessel or static aerated pile system; or
  (iii) Maintained a temperature of between 131° F. and 170° F. for 15 days using a windrow composting system, during which period, the materials must be turned a minimum of five times.

(3) Uncomposted plant materials.

A farmer may manage crop nutrients and soil fertility to maintain or improve soil organic matter content in a manner that does not contribute to contamination of crops, soil, or water by plant nutrients, pathogenic organisms, heavy metals, or residues of prohibited substances by applying:

(1) A crop nutrient or soil amendment included on the National List of synthetic substances allowed for use in organic crop production;

(2) A mined substance of low solubility;

(3) A mined substance of high solubility: Provided, That, the substance is used in compliance with the conditions established on the National List of nonsynthetic materials prohibited for crop production;

(4) Ash obtained from the burning of a plant or animal material, except as prohibited in paragraph (e) of this section: Provided, That, the material burned has not been treated or combined with a prohibited substance or the ash is not included on the National List of nonsynthetic substances prohibited for use in organic crop production; and (5) A plant or animal material that has been chemically altered by a manufacturing process: Provided, that, the material is included on the National List of synthetic substances allowed for use in organic crop production established in § 205.601.

The farmer must not use:

(1) Any fertilizer or composted plant and animal material that contains a synthetic substance not included on the National List of synthetic substances allowed for use in organic crop production;

(2) Sewage sludge (biosolids) as defined in 40 CFR part 503; and (3) Burning as a means of disposal for crop residues produced on the operation: Except, That, burning may be used to suppress the spread of disease or to stimulate seed germination.

In some embodiments, the process inputs, including the liquid ammonium waste stream, and/or the acid, is from certified Organic sources. In some embodiments, the process for making aqueous ammonium solutions described herein can create a certified Organic product.

Concentrators

In some embodiments, the aqueous ammonia solution 110 can be concentrated. In some embodiments, the aqueous ammonia solution 110 can be concentrated using vacuum evaporation or vibrating filters. Ambient pressure or vacuum evaporation removes water solvent, and therefore increases the relative concentration of the aqueous phase components relative to pre-concentrating. Vibrating filters can be used to remove water and salts from the the aqueous ammonia solution 110. In some embodiments, the aqueous ammonia solution 110 can be dewatered by lyophilization. In some embodiments, the aqueous ammonia solution 110 can be dewatered by using a dewatering drum. In some embodiments, the dewatering drum is a vacuum dewatering drum. In some embodiments, the aqueous ammonia solution 110 can be dewatered by azeoptropic removal by the addition of ethanol to form an azeotrope with the water, followed by evaporation of the azeotrope, ethanol, and water under atmospheric or vacuum conditions.

In some embodiments, the ammonium wastewater can be concentrated using the methods described herein.

Fresh Food Waste Hydrolysate

In some embodiments, the high-nutrient plant food is a hydrolysate made from fresh food waste. The fresh food waste hydrolysate can be made by a process involving grinding fresh food waste to produce a ground slurry, heating and incubating the ground slurry with one or more selected enzymes with constant agitation and shear, pasteurizing the incubated mixture to produce a hydrolysate, optionally reducing the fats content in the hydrolysate aqueous phase, optionally reducing the solids content in the hydrolysate, and emulsifying the hydrolysate to yield the fresh food waste hydrolysate. In some embodiments, the fresh food waste hydrolysate can include or exclude those described in U.S. Pat. Nos. 9,643,895 or 9,388,088, herein incorporated by reference in their entirety.

In some embodiments, the fresh food hydrolysate is made by a process comprising the steps of:

(a) providing a selected fresh food waste stream;

(b) grinding the selected fresh food waste stream using a first grinder and optionally a second grinder to produce a first ground slurry;

(c) adding to said first ground slurry one or more selected enzymes;

(d) increasing the temperature of the first ground slurry from ambient temperature to a temperature between about 95° F. and about 140° F. and incubating the first ground slurry under constant agitation and shear at two or more temperatures between about 95° F. and about 140° F., thereby producing a first incubated slurry comprising particles and a first hydrolysate;

(e) pasteurizing the first incubated slurry to kill pathogens; and (f) separating the first incubated slurry into a first hydrolysate and particles.

In some embodiments, the step of adding to the first ground slurry one or more selected enzymes is done before or during the step of increasing the temperature of the first ground slurry from ambient temperature to a temperature between about 95° F. and about 140° F. and incubating the first ground slurry. In some embodiments one or more selected enzymes may be added after the first ground slurry is heated to a temperature between about 95° F. and about 140° F. In some embodiments, the one or more selected enzymes can be added as powder or liquid form. In some embodiments, the liquid form of the one or more selected enzymes can be pre-heated, and/or accelerated with the co-addition of one or more cofactors. In some embodiments, the one or more selected enzymes is added with one or more cofactors. In some embodiments, the cofactor can include or exclude metal cations and coenzymes. The metal cations can include or exclude: cupric, ferrous, ferric, catalase, magnesium, manganese, molybdenum, nickel, and zinc. the coenzymes can include or exclude vitamin and vitamin derivatives of: thiamine pyrophosphate, thiamine, NAD+ and NADP+, niacin, pyridoxal phosphate, pyridoxine, methylcobalamin, vitamin B12, cobalamine, biotin, coenzyme a, pantothenic acid, tetrahydrofolic acid, folic acid, menaquinone, vitamin K, ascorbic acid, flavin mononucleotide, riboflavin, and coenzyme F420.

In some embodiments the first temperature of the incubated first ground slurry may be 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, or 139° F., or any range in between any two of the recited temperatures. In some embodiments a second temperature of the incubated first ground slurry may be 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, or 139, 140, 141, 142, 143, 144, or 145° F., or any range in between any two of the recited temperatures.

In some embodiments, the step of separating the first incubated slurry into a first hydrolysate and particles results in reducing the number of particles in the liquid hydrolysate. In some embodiments, the step of separating the first incubated slurry into a first hydrolysate and particles is performed using selective size separation methods. In some embodiments, selective size separation is performed using a centrifugal separation system. In some embodiments, the selective size separation methods use a reusable filter or mesh. In some embodiments the selective size separation is performed by serial filtration through a coarse screen followed sometime later by filtration through a fine screen. In some embodiments the filter or mesh is made of metal, plastic, glass or ceramic.

In some embodiments, the hydrolysate comprises one or more phases. The first hydrolysate can comprise an oil phase, a particulate phase, and an aqueous phase. In some embodiments, the method of separating the first incubated slurry into a first hydrolysate and particles is performed using a three phase separator. In some embodiments, the three phase separator is a centrifugal separator. The three phase separator can separate all or part of a heavy liquid, light liquid and solid phase, per their different densities and mutually insolubility. The solid phase differentially sediments in a centrifugal force field or gravity force field, which causes the solid particles in the liquid to deposit. In some embodiments, the centrifugal three phase separator is, for example, a Flottweg Separator. In some embodiments, the centrifugal three phase separator is, for example, a Peony Centrifuge. The three phase separator operates at 1,000-7,000 RPM and processes 5 to 50 gallons per minute. In some embodiments, the three phase separator processes 5 to 50 gallons per minute. In some embodiments, the three phase separator processes 15 gallons per minute. In some embodiments, multiple three phase separators can be placed in series or in parallel. When multiple three phase separators are placed in parallel, the first hydrolysate can be processed faster with a lower process time per separator than if the first hydrolysate were processed with a single three phase separator. In some embodiments, the centrifugal three phase separator is, for example, an Alfa Laval centrifuge. In some embodiments, the hydrolysate can be separated using a hydrocyclone to separate the particles from the liquids. The hydrocyclone can be a Sand Separator from Netafim (USA), or a John Deer F1000 Sand Separator (Deer, USA).

In some embodiments, the method for producing fresh food waste hydrolysate further comprises stabilizing and preserving the hydrolysate, using a stabilizer selected from: inorganic acid, organic acid, organic preservative, inorganic preservative. The stabilizing and preserving step may take place either before or after the separating particles.

In some embodiments, the method for producing fresh food waste hydrolysate further comprises emulsifying the stabilized hydrolysate using an ultra-high shear mixer and/or organic or inorganic emulsifiers to produce a stabilized emulsified hydrolysate. In some embodiments, the emulsification step may include adding organic and/or inorganic dispersants to act as surface active ingredients in the stabilized emulsified hydrolysate. In some embodiments, the method comprises blending the stabilized emulsified hydrolysate in one or more storage tanks using one or more circulation pumps with other liquid fertilizer ingredients which may include or exclude vitamins, pesticides, trace inorganic minerals, wood ash, gypsum salts, Epsom salts, worm castings, colorants, fragrances, and viscosity modifiers.

In some embodiments, the method for producing fresh food waste hydrolysate further comprises concentrating the liquid hydrolysate through vibratory filtration equipment (such as may be manufactured by New Logic) or vacuum evaporation equipment (such as may be manufactured by Buflovak or Vobis). In some embodiments, the method further comprises blending the concentrated liquid hydrolysate with other liquid fertilizer ingredients.

In some embodiments, the particles comprise bone, cellulose, solidified or semi-solidified fats, nut shells, fish scales, teeth, inorganic minerals, keratin-containing species, or combinations thereof. In some embodiments, the keratin-containing species is selected from: beaks, feathers, claws, or hair. In some embodiments the incubated hydrolysate is separated from the incubated particles using one or more screens. In some embodiments, the incubated hydrolysate is separated from the incubated particles by centrifugation, settling, the use of a hydrocyclone, a rotaspiral drum screen, or a horizontal belt filter.

In some embodiments, the first grinder and second grinder are not in fluidic communication with each other. In some embodiments, the first grinder and second grinder are in fluidic communication. In some embodiments, the first grinder is not in fluidic communication with the incubation vessel.

Each of the steps recited herein for producing fresh food waste hydrolysate can feature any of the embodiments for that step featured in this disclosure.

In some embodiments, the fresh food waste stream for producing the fresh food waste hydrolysate can be selected from fresh food waste streams including or excluding: bone meal, feather meal, culled vegetable or fruit, grape pomace, tomato pomace, olive pomace, fruit pomace, culled grapes, culled tomatoes, culled olives, peanut hulls, walnut hulls, almond hulls, pistachio hulls, legume hulls, fresh food recyclables, and bakery recyclables. Fresh food recyclables can be provided by obtaining fresh food recyclables collected from, for example, one or more of fresh food waste or recyclables providers, for example, supermarkets, butcher shops, food processing facilities, fresh food distributors, fresh green waste from farms, restaurant grease traps, or other viable sources of fresh food recyclables. In some embodiments, providing fresh food recyclables comprises collecting fresh food recyclables from for example, supermarkets, food wholesalers, food processing facilities, institutions (food preparation recyclables from such facilities as sports venues, schools, hospitals, hotels, cafeterias, and other institutions) fresh food distributors, fresh green recyclables from farms, or other viable sources of fresh food recyclables. In some embodiments, fresh food recyclables are provided by collecting produce, meat, fish, delicatessen, and bakery organics culled by supermarket staff members from food offered for sale by supermarkets.

In some embodiments, the selected enzymes involved in the incubation step for producing fresh food waste hydrolysate can include or exclude: at least one enzyme to digest proteins, at least one enzyme to digest fats and lipids, or at least one enzyme to digest cellulosic material or at least one enzyme to digest other carbohydrates. The selected enzymes may include or exclude: xylanase, asparaginase, cellulase, hemicellulase, glumayase, beta-glumayase (endo-1,3(4)-), urease, protease, lipase, amylase, keratinase, alpha-amylase, phytase, phosphatase, aminopeptidase, amylase, carbohydrase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, keratinase (EC 3.4.99), mannosidase, oxidase, glucose oxidase, pectinolytic enzyme, pectinesterase, peptidoglutaminase, peroxidase, polyphenoloxidase, proteolytic enzyme, protease, ribonuclease, thioglucosidase, and transglutaminase. These enzymes may be selected, for example, from the group consisting of enzymes originating from microbial fermentation, enzymes derived from animal digestion, enzymes derived from a microorganism, and enzymes derived from plants.

In some embodiments, the selected one or more enzymes involved in the incubation step for producing fresh food waste hydrolysate may be added as individual enzymes or enzyme combinations to the slurry at various times, and incubated at selected temperatures. In one embodiment, the selected one or more enzymes is added to the ground slurry in a first enzyme combination comprising at least two of the selected enzymes described herein, and incubated at a first temperature, followed by addition of a second enzyme combination comprising two or more selected enzymes, and incubation at a second temperature. In some embodiments, a third enzyme combination can be added comprising two or more selected enzymes, and incubated at a temperature suitable for, or optimized for the activity of the enzymes in the enzyme combination. In some embodiments the final enzyme or enzyme combination may comprise a protease, to avoid digestion of previously added enzymes.

In one embodiment, a first enzyme combination of the selected enzymes involved in the incubation step for producing fresh food waste hydrolysate is added during a first incubation step at a first temperature between about ambient temperature (e.g., 55 degrees F. (Fahrenheit) to about 90 degrees F., including 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 degrees F.) to 140 degrees F., to form an incubating mixture. In some embodiments, the first temperature is selected from 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, and 139 degrees F., or any range between any two of the recited temperatures. In one embodiment, the first enzyme combination can be added at an ambient first temperature, and enzymatic processes begin while the system is heated up to a second temperature. The incubation with the first enzyme combination can be carried out for the entirety of the heat ramp time to achieve the second temperature. The time for the heat ramp time can be between from about 20 minutes to about 6 hours, preferably 20 minutes to 1.5 hours, even more preferably 30 minutes to 1 hour. In some embodiments, the time for the heat ramp time can is selected from: 20, 25, 30, 35, 40, 45, 50, 55, and 60 minutes. In some embodiments, the time for the heat ramp time is selected from: 1, 1.25, 1.5, 1.75, 2, 2.25, 2.5, 2.75, 3, 3.25, 3.5, 3.75, 4, 4.25, 4.5, 4.75, 5, 5.25, 5.5, 5.75 and 6 hours, or any range in between any two heat ramp times. The first selected enzyme combination may in some embodiments of this disclosure comprise at least one cellulase and at least one lipase. Preferably the first selected enzyme combination comprises enzymes for digesting complex carbohydrates from plants, for example endocellulase, exocellulase (or another cellulase formulation), and lipase. The first temperature may in some embodiments, preferably be about 95 degrees F. to about 140 degrees F., or any temperature described herein for the first temperature. In some embodiments, the incubating mixture is incubated at the first temperature for about 30 minutes. In some embodiments, an organic or inorganic chemical and/or buffer with a pKa enabling a pH above 7.0 may be added to the incubating mixture to increase the pH of the mixture and increase the effectiveness of the first enzyme combination.

In one embodiment, at least a second combination of selected enzymes involved in the incubation step for producing fresh food waste hydrolysate may be added to the incubating mixture, and a second incubation step may be carried out at a second temperature between about 96 degrees F. to 145 degrees F. In some embodiments, the second temperature is selected from: 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, or 145 degrees F., or any range between any two of the recited temperatures. The time of the second incubation may be, in some embodiments, between about 1 to about 18 hours or more, preferably between 1.2 to 6 hours, more preferably about 1.5 hours to 2 hours. In some embodiments, the second incubation time is selected from: 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, and 18 hours, or any range in between any two incubation times.

In some embodiments, the second enzyme combination involved in the incubation step for producing fresh food waste hydrolysate may comprise at least one pectinase, at least one protease, and alpha-amylase. In some embodiments, one protease may be added after one pectinase and alpha-amylase in a third enzyme combination. In some embodiments, the alpha-amylase can be 1,4-alpha-D-glucan glucanohydrolase (e.g., glycogenase).

In one embodiment, when the fresh food waste stream involved in the method for producing fresh food waste hydrolysate comprises culled fruits or vegetables, the selected enzymes can be selected from: a cellulase, a pectinase, a ligninase, an amylase, and combinations thereof. In some embodiments, the pectinase can be selected from: pectolyase, pectozyme, polygalacturonase, and combinations thereof. Without being bound by theory, a pectinase breaks down the pectin (e.g., polymethyl galacturonate) comprising the cell walls of the fruit or vegetable. The amylase can be selected from: alpha-amylase, beta-amylase (1,4-α-D-glucan maltohydrolase), gamma-amylase (glucan 1,4-α-glucosidase; amyloglucosidase; or exo-1,4-α-glucosidase), and combinations thereof. The amylase can catalyze the hydrolysis of starch into sugars. The cellulase can break down cellulose molecule into monosaccharides such as beta-glucose, or shorter polysaccharides and oligosaccharides. In some embodiments, the cellulose can be selected from: endocellulases (EC 3.2.1.4), exocellulases or cellobiohydrolases (EC 3.2.1.91), cellobiases (EC 3.2.1.21), oxidative cellulases, cellulose phosphorylases, and combinations thereof. In some embodiments, the cellulase can be selected from: endo-1,4-beta-D-glucanase (beta-1,4-glucanase, beta-1,4-endoglucan hydrolase, endoglucanase D, 1,4-(1,3,1,4)-beta-D-glucan 4-glucanohydrolase), carboxymethyl cellulase (CMCase), avicelase, celludextrinase, cellulase A, cellulosin AP, alkali cellulase, cellulase A 3, 9.5 cellulase, pancellase SS, and combinations thereof.

The temperature and pH of an incubation with one or more selected enzymes involved in the incubation step for producing fresh food waste hydrolysate can be selected in order to optimize, or be suitable, for the activity of the enzymes in the reaction mixture. In some embodiments, a first temperature and pH may be selected in order to optimize, or be suitable, for the activity of the first selected one or more enzymes in a first enzyme combination, while a second temperature and pH may be selected in order to optimize, or be suitable, for the activity of the selected enzymes in a second selected enzyme combination. In other embodiments, the timing of an enzyme combination may be selected in order to minimize the impact of enzymes on each other. In one embodiment, when a protease is added in combination with another selected enzyme, the protease would be added second, such that the protease would not degrade the other selected enzyme.

In some embodiments, after incubating the ground slurry with the one or more selected enzymes involved in the incubation step for producing fresh food waste hydrolysate, the incubated ground slurry can be heated to between about 150 to 180 degrees F., preferably 150-170 degrees F., for about 30 minutes to about 18 hours, preferably from about 30 minutes to 2 hours, to further pasteurize the ground slurry. In some embodiments, the ground slurry is heated for at a temperature selected from: 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, and 180 degrees F., or any range between any two recited temperatures. In some embodiments, the ground slurry is heated for about a time selected from: 30, 35, 40, 45, 50, 55, and 60 minutes; or 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, and 18 hours, or any range in between any two recited times.

While the incubation and constant agitation and shear steps involved in the steps for producing fresh food waste hydrolysate are highly likely to reduce pathogen concentrations to non-detectible levels, a pasteurization step at a temperature range and duration commonly used in pasteurization processes further reduces the risk of pathogen contamination to levels that are undetectable under current pathogen detection technology. In some embodiments, the pasteurization is performed for about 15 minutes to about 1 hour. In some embodiments, the pasteurization step is performed for a time selected from: 15, 20, 25, 30, 35, 40, 45, 50, 55, and 60 minutes. In some embodiments, the pasteurization step may be performed at various combinations of temperature, pressure, and duration, as commonly used in pasteurization processes. In these embodiments, the pasteurization may be performed, for example, from about 15 minutes to about 12 hours, for any length of time at 15 minute intervals between 15 minutes to 12 hours (e.g., 15 minutes, 30 minutes, 45 minutes, etc.), or any pasteurization time described herein. In some embodiments, the temperature can be from about 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, or 180 degrees F., or more, or any temperature or range falling between any two of those temperatures. In some embodiments, the pasteurization may be performed at 1-10 atm (atmospheres) pressure. In some embodiments, the pasteurization may be performed at 1, 2, 3, 4, 5, 6, 6, 7, 9, or 10 atm pressure.

In some embodiments, the processes of this disclosure involved in the steps for producing fresh food waste hydrolysate inactivate pathogens in the fresh food waste stream or the environment. The methods of this disclosure are therefore useful in eliminating pathogens present in fresh food waste streams during the production of compositions that can safely be used as organic fertilizers to crops.

In some embodiments, the grinder used to grind fresh food waste streams involved in the steps for producing fresh food waste hydrolysate can be a rotary knife grinder, which produces particles in the particulate slurry with an average size of about ½ of an inch. In some embodiments, the ground slurry is then pumped to an in-line low RPM/high torque grinder with shredding action to further ensure that the ground slurry has an average particle size of about ½ of an inch or less. The low RPM/high torque grinder may be used in any process for any system with even low levels of throughput, but is particularly suitable for use in a high throughput processing system, for example, a system capable of processing more than over 50 tons per day, e.g., more than 90 tons/day, or up to 95 or 100 tons per day or more. The ground slurry produced by the first grinder, or the first grinder and the optional second grinder, is then pumped into a temperature controlled incubation vessel, where it undergoes constant mixing and incubation with enzyme combination(s) at desired temperatures.

In addition, the incubation vessel involved in the steps for producing fresh food waste hydrolysate may contain a recirculating line connected to an in-line grinder with shearing action which is used during all or a part of the incubation and pasteurization. This may be the third grinder in embodiments of the disclosure where an optional in-line grinder with shredding action is used to further grind the ground slurry, but it is the second grinder in embodiments of the disclosure where the optional grinder is not used. In some embodiments, the in-line grinder used during all or a part of the incubation with the enzyme combination comprises a high shear mixer. In some embodiments the in-line grinder comprises a high shear mixer with a disintegrating head. In some embodiments, the high shear in-line grinder is used beginning at about 30 minutes to about 1 hour after incubation begins and continues through the pasteurization step. In some embodiments, the start and run times may vary, and still achieve the same particle size reduction objectives. In some embodiments, the particles in the resulting hydrolysate may be less than ¹⁄₁₆th and about ¹⁄₃₂nd of an inch. In some embodiments, the particles in the resulting hydrolysate may be less than $3/32^{nd}$, $1/8^{th}$, or $3/8^{th}$ of an inch. In some embodiments, the particles in the resulting hydrolysate can be around $1/64^{th}$ of an inch.

The processes described herein involved in the steps for producing fresh food waste hydrolysate hydrolysate can produce particles. In some embodiments, the particles comprise bone, cellulose, solidified or semi-solidified fats, nut shells, fish scales, teeth, inorganic minerals, keratin-containing species, and combinations thereof. In some embodiments, the keratin-containing species is selected from: beaks, feathers, claws, or hair. Without being bound by theory, the solidified fats can result from incomplete fat hydrolysis, or fats which are soluble at the incubation temperature but become solid or semi-solid upon cooling. In some embodiments, the levels of particles (e.g., solid or semi-solid fats) in the can be controlled using controlled centrifugation processes. In some embodiments, the controlled centrifugation processes can include or exclude a fixed number of centrifuge speeds, one or more steps, a ramping centrifuge speed between two or more different centrifuge speeds, and one or more centrifuge times. The particles can be separated from the hydrolysate by a variety of methods. In some embodiments, the particles can be separated by: screens, filters, sedimentation, centrifugation, the use of a hydrocyclone, a rotaspiral drum screen, and a horizontal belt filter. In some embodiments, one or a plurality of screens is used to separate particles from the hydrolysate. In some embodiments, screening or filtering of the pasteurized hydrolysate through one or more mesh screens may be used to separate the hydrolysate from particles that do not pass through the mesh. In some embodiments, the hydrolysate produced by incubating is then separated using a 30 mesh screen with an opening of 590 microns. In some embodiments, the 30 mesh screen is a vibrating screen. This separates the hydrolysate from particles too large to pass through the mesh, for example, particles having an average diameter larger than 590 microns. The hydrolysate passing through the first screen may then be further separated by filtering through a 200 mesh screen with an opening size of 74 microns. In some embodiments, the incubated particles removed from the hydrolysate by screening through the 200 mesh screen have a diameter of greater than 74 microns. In some embodiments the screen may be a vibrating screen. In some embodiments, a coarse screen and a fine screen can be used in two steps to separate and isolate the particles from the hydrolysate. In some embodiments, a mesh screen having 18-60 mesh may be used in a first screening step ("coarse screen"), for example 18 mesh screen with 1000 micron openings, 20 mesh screen with 841 micron openings, 25 mesh screen with 707 micron openings, 30 mesh screen with 590-595 micron openings, 35 mesh screen with 500 micron openings, 40 mesh screen with 400 micron openings, 45 mesh screen with 354 micron openings, 50 mesh screen with 297 micron openings, or 60 mesh screen with 250 micron openings, or other commercially available coarse screening technologies. The purpose of this screen is to separate solids or semi-solids, from the liquid hydrolysate, and can be accomplished through a variety of known screening techniques. In some embodiments a mesh screen having 35 to 400 mesh may be used in the second screening step ("fine screen"), for example, 35 mesh screen with 500 micron openings, 40 mesh screen with 400 micron openings, 45 mesh screen with 354 micron openings, 50 mesh screen with 297 micron openings, or 60 mesh screen with 250 micron openings, 70 mesh screen with 210 micron openings, 80 mesh screen with 177 micron openings, 100 mesh screen with 149 micron openings, 120 mesh screen with 125 micron openings, 140 mesh screen with 105 micron openings, 170 mesh screen with 88 micron openings, 200 mesh screen with 74 micron openings, 230 mesh screen with 63 micron openings, 270 mesh screen with 53 micron openings, 325 mesh screen with 44 micron openings or 400 mesh screen with 37 micron openings, or other commercially available fine screening technologies. The purpose of this screen is: i) to increase particle surface area, thereby increasing the effectiveness of the enzymes used to produce the hydrolysate; ii) to assure the ability of the pasteurized hydrolysate to pass easily through the farmer's drip lines, or other similar equipment; and iii) to ensure that the pasteurized hydrolysate is available for metabolism by soil organisms, once it is delivered to the root zone. This purpose can be accomplished through a variety of known screening techniques. In some embodiments, the particles separated by the fine screen, having a diameter between about 74 microns and about 590 microns, may be recycled as a feedstock to be digested in the next batch. This material will digest in the next batch, without accumulating.

In one embodiment, the methods involved in the steps for producing fresh food waste hydrolysate can include a stabilization step following incubation of the ground slurry with the one or more selected enzymes. In one embodiment, the stabilization step can occur after separation of the particles from the hydrolysate. In some embodiments, the separated dewatered aqueous phase produced from the centrifuge separation step can be stabilized before dewatering or after dewatering by the addition of a stabilizer. In some embodiments, the stabilizing step can also include a preserving step, for example, by using inorganic acid, organic acid, inorganic preservatives, or organic preservatives, emulsifiers or dispersants, including those which are allowed for use in the production of a certified Organic hydrolysate. In some embodiments, the stabilizing step of the processes of this disclosure comprises the addition and mixing of the fresh food waste hydrolysate with an acid source consisting of hydrochloric, sulfuric, phosphoric, acetic, stearic, propionic, tartaric, maleic, benzoic, succinic acids, lactic, or citric acid, preferably phosphoric acid. Lactic acid, acetic acid, citric acid or other organic certified acids may also be preferably used to make certified Organic fertilizer. For example, phosphoric acid or lactic acid may be added to lower the pH of the composition to inhibit microbial and/or pathogenic activity during the storage and transport of the composition which protects the nutrients from further digestion and/or degradation by microbes or pathogens. In some embodiments, phosphoric acid may be tricalcium phosphate. In some embodiments, the pH of the stabilized liquid hydrolysate is less than about 3.5. In some embodiments, the pH of the stabilized fresh food waste hydrolysate is from about 2.5 to about 3.5, preferably about 3.0. In some embodiments, the pH of the fresh food waste hydrolysate is selected from: 2.4, 2.5, 2.6, 2.7, 2.8, 2.9, 3.0, 3.1, 3.2, 3.3, 3.4, 3.5, 3.6, 3.7, 3.8, 3.9, or 4.0 or between any of the aforementioned pH levels. The stabilized product may be quarantined overnight, while the contents are tested to assure the elimination of pathogens. Without being bound by theory, the stabilization step can produce a finished product that is shelf stable for at least two years, which can be accomplished through any of a variety of stabilization steps as described herein.

Although the pasteurization step involved in the steps for producing fresh food waste hydrolysate inactivates any bacteria or other pathogens present in the fresh food waste or the processing plant, the stabilization prevents growth of pathogens from environmental sources after the pasteurization step. Without stabilization, microbes and pathogens could contaminate and degrade a liquid hydrolysate even after sterilizing the hydrolysate. The stabilized product is buffered in the soil to a pH similar to the soil pH, which, under normal circumstances, will cause the liquid pasteurized hydrolysate to become biologically active, which is the desired mode of action for the product.

A preservative ("stabilizer") such as sorbic acid, potassium sorbate, tocopherol, d-alpha-tocopherol acetate, resveratrol, rosemary oil, erythorbic acid, sodium erythorbate, sodium ascorbate, iso-ascorbic acid, sodium iso-ascorbate, potassium nitrate, ethyl lauroyl arginate, benzoic acid, ascorbyl palmitate, ascorbyl stearate, *sulphurous* acid, methyl-p-hydroxy benzoate, methyl paraben, potassium bisulphite, potassium lactate, sodium lactate, sodium diacetate, butylated hydroxyanisole (a mixture of 2-tertiarybutyl-4-hydroxyanisole and 3-tertiarybutyl-4-hydroxyanisole), butylated hydroxytoluene (3,5-ditertiarybutyl-4-hydroxytoluene), potassium metabisulphite, propyl-p-hydroxy benzoate, calcium propionate, calcium sorbate, citric acid esters of mono- and diglycerides, dimethyl dicarbonate, natamycin, propyl gallate, potassium sulfate, thyme extract, potassium benzoate or any other suitable food additive preservative may also optionally be added as a preservative during the stabilization step involved in the steps for producing fresh food waste hydrolysate. For certified Organic blended nitrogen-supplemented fertilizer, tocopherol, D-alpha-tocopherol acetate, natamycin, mined potassium sulfate, or any other food preservative certified for organic use may be added as a preservative. In some embodiments, about the preservative is at a concentration from 0.1 to about 2.0%, preferably 0.25% (weight percent) in the fresh food waste hydrolysate. In some embodiments, the concentration of the preservative is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0 (weight percent) or any weight percentage between any of the aforementioned weight percentages. In some embodiments, Tocopherol or D-alpha-tocopherol acetate are added at levels ranging from 10 to 500 mg/kg, or any amount between those values. Natamycin may be added, in some embodiments, at levels, for example of 0.1 to 100 mg/mL, or any amount between those values. In another embodiment, other preservatives may be added (together with the preservatives listed above, "preservatives") and/or those preservatives approved for use in certified Organic products ("organic preservatives").

In some embodiments, grinding of the inputs involved in the steps for producing fresh food waste hydrolysate may be carried out using a rotary knife grinder. In some embodiments, the inputs involved in the steps for producing fresh food waste hydrolysate may be further ground with a low RPM/high torque grinder with shredding action may also be used to further grind the inputs involved in the steps for producing fresh food waste hydrolysate.

In some embodiments, the incubating ground slurry involved in the steps for producing fresh food waste hydrolysate can be sheared with a high shear grinder with shearing action, which can comprise, for example, a high shear mixer with a disintegrating head, during all or a part of the incubating and pasteurizing steps. A high-shear mixer disperses or transports one phase or ingredient (liquid, solid, or gas) into a main continuous phase (liquid), with which it would normally be immiscible. A rotor or impeller, together with a stationary component known as a stator, or an array of rotors and stators, is used either in a tank containing the solution to be mixed, or in a pipe through which the solution passes, to create shear. The high shear grinder can impart a high shear rate onto the slurry. In some embodiments, the high shear grinder can be, for example, the ARDE Dicon In-Line Dispersing Grinder, or a Silverson Mixer Homogenizer. As used herein, "shear" refers to a cutting action that reduces food particle size, increasing its surface area, and therefore, its interaction with enzyme molecules. In some embodiments, high shear can be created by circulating the slurry through a high speed, high shear mixer throughout the digest at rates in the range of $10^5$-$10^6$ sec$^{-1}$ or more.

In some embodiments, the incubation process involved in the steps for producing fresh food waste hydrolysate can include or exclude a magnetic trap. The magnetic trap can pull out and/or trap metallic objects which may be present in the fresh food recyclable stream. In some embodiments, the metallic objects can include or exclude coins, twist-ties, buttons, cans, and can parts. The magnetic trap can comprise a magnet. The magnet can be a permanent magnet or an electromagnet. The electromagnet can be configured to become magnetic upon the introduction of the ground fresh food recyclables into the incubation chamber.

Compositions Comprising Organic Ammonium and High-Nutrient Plant Food, and Methods of their Use to Increase Crop Yields In some embodiments, the organic ammonium compositions made by the methods and processes and by the systems described herein can be further combined with an exogenous high-nutrient plant food to further increase the nutrient profile of a blended nitrogen-supplemented fertilizer for administering to plants. In alternative embodiments, the aqueous ammonium salt solutions can be used without blending with exogenous high nutrient plant foods, for administering to crops as a fertilizer or fertilizer component.

The exogenous high-nutrient plant food to be combined with the organic ammonium can include or exclude animal waste, animal parts, and/or processed organics. The animal waste can include or exclude: cow manure or chicken manure. The animal parts can include or exclude bird feathers, bone meal, blood meal, and eggshells. The processed organics can include or exclude: anaerobically digested manure, food waste, or animal parts; aerobically digested manure, food waste, or animal parts; or fermented fish. The anaerobically digested food waste can include or exclude fresh food waste hydrolysate. The fresh food waste hydrolysate ("H2H") can be those described in U.S. Pat. Nos. 9,643,895 or 9,388,088, herein incorporated by reference in their entirety.

In some embodiments, the ratio of the aqueous ammonium solution and the exogenous high-nutrient plant food in the blend can be varied to achieve a final nitrogen concentration. For example, to make a 5% N (wt) from a 3% N product exogenous high-nutrient plant food (e.g, H2H), and an aqueous ammonium solution ("AN") having a 8% (wt) N concentration, a blend of 60% H2H:40% AN would be made. A range of final N % can be prepared depending on the % N in the ammonium solution and the % N in the exogenous high nutrient plant food (e.g., H2H), as shown in the table below.

| Target N | Organic Ammonium Concentration (N %) | | | | | |
|---|---|---|---|---|---|---|
| | 5% | 6% | 7% | 8% | 9% | 10% |
| H2H 1% | 20% | 33% | 43% | 50% | 56% | |
| (N %) 2% | 25% | 40% | 50% | 57% | 63% | |
| 3% | 33% | 50% | 60% | 67% | 71% | |

In one embodiment, the blended nitrogen-supplemented fertilizer of this disclosure are suitable for use as fertilizer and soil amendment. The high nutrient concentration in the blended nitrogen-supplemented fertilizer provides nutrients directly to the plants (including amino acids) and also increases the organic matter in the soil by providing nutrients for soil organisms. These soil organisms which obtain nutrients from the blended nitrogen-supplemented fertilizer of this disclosure grow and promote plant growth, through nitrogen fixation or by providing additional organic nutrients for plants and otherwise improving soil quality. For example, liquid hydrolysates comprising amino acids, fatty acids, sugars, and minerals not only make nutrients directly available to plants, but also improve the soil by sustaining soil organisms including earthworms and microorganisms, including, for example, nitrogen fixing organisms (e.g., bacteria and archaea) and aerobic bacteria and fungi (e.g., mycorrhizae), nematodes, protozoa, and a range of invertebrates. The amount of soil organisms increases after application to the soil of the blended nitrogen-supplemented fertilizer described herein. In some embodiments, application of the blended nitrogen-supplemented fertilizer described herein to soil increases the amount of soil organic matter. The soil organic matter content can be measured by pyrolysis-GC/MS (as described in Grandy, et al., Geoderma, 150, 278-286 (2009)).

In some embodiments, the blended nitrogen-supplemented fertilizer of this disclosure comprise nutrients. The nutrients can include or exclude amino acids (indispensable and dispensable amino acids), macro minerals, microminerals, carbohydrates, saturated fatty acids, and unsaturated fatty acids. The amino acids can include or exclude arginine, histidine, isoleucine, leucine, lysine, methionine, threonine, phenylalanine, tryptophan, valine, alanine, aspartic acid, cysteine, glutamic acid, glycine, proline, serine, and tryptophan. In some embodiments, the range of arginine in the fresh food waste hydrolysate can be from 0.5 to 5 wt %, preferably 1.0 to 1.5 wt %; the range of histidine can be from 0.2 to 5 wt %, preferably 0.5 to 1.0 wt %; the range of isoleucine can be from 0.2 to 5 wt %, preferably 0.5 to 1.5 wt %; the range of leucine can be from 0.5 to 10 wt %, preferably 1.3 to 2.0 wt %; the range of lysine can be from 0.2 to 5 wt %, preferably 1.0 to 2.0 wt %; the range of methionine can be from 0.2 to 5 wt %, preferably 0.4 to 1.0 wt %; the range of threonine can be from 0.2 to 5 wt %, preferably 0.7 to 1.5 wt %; the range of phenylalanine can be from 0.2 to 5 wt %, preferably 0.5 to 1.5 wt %; the range of tryptophan can be from 0.03 to 5 wt %, preferably 0.1 to 3.0 wt %; the range of valine can be from 0.1 to 5 wt %, preferably 0.7 to 1.5 wt %; the range of alanine can range from 0.1 to 5 wt %, preferably 0.7 to 1.8 wt %; the range of aspartic acid can be from 0.2 to 5 wt %, preferably 1.5 to 2.5 wt %; the range of cysteine can be from 0.03 to 5 wt %, preferably 0.1 to 0.3 wt %; the range of glutamic acid can be from 0.2 to 10 wt %, preferably 2.5 to 4.0 wt %; the range of glycine can be from 0.2 to 10 wt %, preferably 1.0 to 2.0 wt %; the range of proline can be from 0.01 to 5 wt %, preferably 0.03 to 1.5 wt %; the range of serine can be from 0.1 to 5 wt %, preferably 0.5 to 1.0 wt %; and/or the range of tryptophan can be from 0.1 to 5 wt %, preferably 0.4 to 1.0 wt %. In some embodiments, the macro minerals can include or exclude: Ca, P, K, Mg, and Na. The range of Ca in the fresh food waste hydrolysate can be from 0.1 to 15 wt %, preferably 0.3 to 5.5 wt %; the range of P can range from 0.05 to 15 wt %, preferably 0.2 to 2.5 wt %; the range of K can range from 0.2 to 15 wt %, preferably 0.5 to 1.5 wt %; the range of Mg can range from 0.01 to 5 wt %, preferably 0.08 to 0.2 wt %; and/or the range of Na can range from 0.05 to 5 wt %, preferably 0.2 to 0.8 wt %. In some embodiments, the microminerals can include or exclude Cu, Fe, Zn and Mn. In some embodiments, the range of Cu in the blended nitrogen-supplemented fertilizer can be from 0.1 to 100 ppm, preferably from 2 to 11 ppm; the range of Fe can be from 10 to 1000 ppm, preferably from 90 to 225 ppm; the range of Zn can be from 10 to 1000 ppm, preferably from 15 to 90 ppm; and/or the range of Mn can be from 0.1 to 200 ppm, preferably from 5 to 25 ppm. In some embodiments the carbohydrates can include or exclude: fructose, glucose, sucrose, stachyose, starch, acid detergent fiber, neutral detergent fiber, acid detergent lignin, hemicellulose, and cellulose. In some embodiments, the range of fructose can be from 0.5 to 20 wt %, preferably from 2 to 8 wt %; the range of glucose can be from 0.5 to 20 wt %, preferably from 2 to 11 wt %; the range of sucrose can be from 0.01 to 20 wt %, preferably from 0.02 to 0.08 wt %; the range of stachyose can be from 0 to 2 wt %, preferably from 0.01 to 0.12 wt %; the range of starch can be from 0.01 to 20 wt %, preferably from 0.3 to 6 wt %; the range of acid detergent fiber can be from 0.01 to 40 wt %, preferably from 0.8 to 23 wt %; the range of neutral detergent fiber can be from 0.5 to 45 wt %, preferably from 2 to 32 wt %; the range of acid detergent lignin can be from 0 to 20 wt %, preferably from 0.4 to 8 wt %; the range of hemicellulose can be from 0 to 20 wt %, preferably from 0 to 12 wt %; and/or the range of cellulose can be from 0.01 to 25 wt %, preferably from 0.6 to 14 wt %. In some embodiments, the saturated fatty acids of the fresh food waste hydrolysates can include or exclude myristic (14:0), C15:0, palmitic (16:0), margaric (17:0), stearic (18:0), arachidic (20:0), behenoic (22:0), and lignoceric (24:0). In some embodiments, the range of myristic acid can be from 1.0 to 15 wt %, preferably from 2 to 4 wt %; the range of C15:0 can be from 0.1 to 2 wt %, preferably from 0.2 to 0.5 wt %; the range of palmitic acid can be from 1.0 to 45 wt %, preferably from 20 to 30 wt %; the range of margaric acid can be from 0.1 to 15 wt %, preferably from 0.5 to 2 wt %; the range of stearic acid can be from 1.0 to 30 wt %, preferably from 9 to 15 wt %; the range of arachidic acid can be from 0 to 5 wt %, preferably from 0.1 to 0.5 wt %; the range of behenoic acid can be from 0 to 5 wt %, preferably from 0.05 to 0.25 wt %; and/or the range of lignoiceric acid can be from 0 to 5 wt %, preferably from 0.02 to 0.2 wt %. In some embodiments, the unsaturated fatty acids can include or exclude myristoleic (9c-14:1), palmitoleic (9c-16:1), elaidic acid (9t-18:1), oleic acid (9c-18:1), vaccenic acid (11c-18:1), linoelaidic acid (18:2t), linoleic acid (18:2n6), linolenic acid (18:3n3), stearidonic (18:4n3), gonodic acid (20:1n9), c20:2, homo-α-linolenic (20:3n3), arachidonic (20:4n6), 3n-archidonic (20:4n3), EPA (22:1n9), erucic (22:1n9), clupanodonic (22:5n3), DHA (22:6n3), and nervonic (24:1n9). In some embodiments, the range of myristoleic can be from 0 to 5 wt %, preferably from 0.3 to 0.8% wt. %; the range of palmitoleic can be from 0.5 to 15 wt %, preferably from 2 to 4 wt. %; the range of elaidic can be from 0.5 to 15 wt %, preferably from 2 to 5 wt. %; the range of oleic can be from 33 to 43 wt. %; the range of vaccenic can be from 2 to 3 wt. %; the range of linoelaidic can be from 0 to 1.5 wt %, preferably from 0.01 to 0.03 wt. %; the range of linoleic can be from 0.5 to 45 wt %, preferably from 10 to 25 wt. %; the range of linolenic can be from 0.51 to 15 wt %, preferably from 1 to 2.5 wt. %; the range of gonodic can be from 0 to 5 wt %, preferably from 0.03 to 0.5 wt. %; the range of c20:2 can be from 0 to 5 wt %, preferably from 0.1 to 0.2 wt. %; the range of homo-a-linolenic can be from 0 to 1.5 wt %, preferably from 0.02 to 0.03 wt. %; the range of arachidonic can be from 0.05 to 1.5 wt %, preferably from 0.15 to 0.3 wt. %; the range of EPA can be from 0 to 5 wt %, preferably from 0.05 to 0.25 wt. %; the range of erucic can be from 0 to 5 wt %, preferably from 0.2 to 0.15 wt. %; the range of clupanodonic can be from 0 to 1 wt %, preferably from 0.2 to 0.08 wt. %; the range of DHA can be from 0 to 1.5 wt %, preferably from 0.05 to 0.15 wt. %; and/or the range of nervonic can be from 0 to 1 wt %, preferably from 0.01 to 0.05 wt. %. The range of any of the aforementioned nutrients can be a percentage between any two recited percentages. When blended with the aqueous or dried ammonium solutions described herein, the relative weight percentages of the components of the fresh food waste hydrolysate are reduced proportionately.

The blended nitrogen-supplemented fertilizers of this disclosure exhibit favorable properties over conventional organic plant food (e.g., those without added organic ammonium salt solutions). The blended ammonium is better for the nitrogen cycle in plants. In contrast, conventional organic plant food consists of most nitrogen in the form of amino acids and proteins, which require the plant to exert energy to convert to useful form. Furthermore, when the organic plant food is fresh food waste hydrolysate as described herein, the relatively low pH of the hydrolysate stabilizes the ammonium in solution so as to retain the total nitrogen concentration until needed as a plant nutrient.

When the soil organisms obtaining nutrients from the blended nitrogen-supplemented fertilizer of this disclosure die they decay and in turn provide more organic nutrients for the soil organisms and the plants, providing additional organic matter and nutrients for plants over a sustained period of time and increasing soil organic matter. The increase in organic matter in the soil stimulates plant root growth, flowering, and fruiting, and increases crop yields. In one embodiment, the blended nitrogen-supplemented fertilizer of this disclosure may more than double soil organic matter. In some embodiments, the blended nitrogen-supplemented fertilizer of this disclosure may increase soil organic matter by up to 150% or more, preferably increasing soil organic matter by between about 10% and about 150%, depending on the initial level of soil organic matter.

When used as a fertilizer and soil amendment, the blended nitrogen-supplemented fertilizers of this disclosure provide higher crop yields by, for example, providing nourishment to plants in the form of nutrients and increasing organic matter in the soil and by supporting the growth of beneficial soil organisms.

The blended nitrogen-supplemented fertilizer of this disclosure may promote faster initial growth after germination, increase root growth, increase canopy growth, increase vigorous root growth to form more extensive root systems, increase field and/or greenhouse crop yields and/or increase the quality or flavor of the produce relative to the use of nitrate fertilizers alone, for example by increasing the levels of sugar and/or other flavor components.

In one embodiment the blended nitrogen-supplemented fertilizers of this disclosure may be applied using irrigation drip lines. In some embodiments, the blended nitrogen-supplemented fertilizers of this disclosure are diluted prior to use. For example, the blended nitrogen-supplemented fertilizers may be diluted with water to 1/5, 1/6, 1/7, 1/8, 1/9, 1/10 or in some applications, to as little as 5%, 4%, 3%, 2%, or 1% or less prior to use. In some embodiments, the blended nitrogen-supplemented fertilizer may be presented in a dry powder form, and dissolved in water prior to use. Preferably the blended nitrogen-supplemented fertilizer is diluted to 1/10 or as low as 1% (wt.) or less prior to use. In some embodiments, the suitability of the blended nitrogen-supplemented fertilizer of this disclosure for use with drip irrigation without clogging drip lines results from grinding and emulsification of water and oil soluble particles in the hydrolysates. Flushing and/or cleaning of drip lines with water following may also be desirable to avoid microbe growth in drip lines following application of the hydrolysates of this disclosure. In some embodiments, the blended nitrogen-supplemented fertilizer is applied to crops by spraying, preferably via a sprinkler.

In another embodiment, this disclosure relates to a method of increasing the yield of produce (crop yield), the method comprising applying by drip line irrigation a composition comprising an blended nitrogen-supplemented fertilizer made by the processes described herein, the blended nitrogen-supplemented fertilizer comprising nutrients released by grinding, shearing, homogenization and enzymatic digestion of fresh food waste hydrolysate as the exogenous high nutrient plant food, and an acid stabilizer, wherein the blended nitrogen-supplemented fertilizer has an average particle size of less than about 30 microns and a pH of between about 2.5 and 3.5, wherein the yield of produce can be increased by at least 10% in some crops, and over 40% in other crops compared to treatment with nitrate or ammonia based fertilizer alone.

In some embodiments, application of the fertilizers of this disclosure increase crop yield relative to the use of nitrate fertilizers alone, as described herein. Preferably the use of the hydrolysate-based fertilizers of this disclosure increase crop yield relative to nitrate fertilizer alone by at least 10%, 15%, 20%, 25%, 30%, 35% 40%, 45%, 50%, 60%, 70%, 80%, 90%, 100%, 200%, 300%, or 400%, over a growing season.

In some embodiments, higher crop yields than nitrate fertilizers alone can be obtained using the blended nitrogen-supplemented fertilizer of this disclosure by a method comprising the steps of:

(a) providing a blended nitrogen-supplemented fertilizer produced by the methods described herein;

(b) applying the blended nitrogen-supplemented fertilizer to a plant;

(c) irrigating the plant with water; and (d) harvesting the plant or plant products and comparing the mass yield with a plant which was not administered the blended nitrogen-supplemented fertilizer.

In some embodiments, beneficial soil microbes or fungi can be added to the blended nitrogen-supplemented fertilizer of this disclosure before applying to crops. This may be done in a fermentation tank in water, where the temperature, pH, oxygen levels, and agitation are maintained at levels to maximize the increase in microbial colony counts prior to shipping the production from such fermentation tank to farms for application to crops through their irrigation system. The beneficial soil microbes, beneficial bacteria, and/or beneficial fungi can undergo colony expansion between the processing time and the presentation to the crops. Alternatively, the blended nitrogen-supplemented fertilizer may be applied in the soil through farm irrigation equipment, followed shortly thereafter by application of beneficial soil microbes or fungi, thus facilitating the increase of colony expansion for such microbes. In some embodiments, when soil microbes are added to the blended nitrogen-supplemented fertilizer, the stabilization step may not be performed so as to ensure the viability of the microbes.

In some embodiments, the blended nitrogen-supplemented fertilizers of this disclosure can be used to increase crop yields. In some embodiments, the crop types are selected from any plant-based crop, including fruits and vegetables. In some embodiments, the crop type is selected from a crop which can include or exclude: lettuce, spinach, gourds, cherries, apricots, cauliflower, broccoli, strawberries, tomatoes, grapes, apples, oranges, tangerines, pears, plums, peaches, watermelons, cantaloupe, kale, arugula, sprouts, lemons, limes, grapefruit, pomelo, collard greens, avocadoes, cabbage, jalapeno peppers, bell peppers, blueberries, peaches, nectarines, *allium* species, sugar beets, soybeans, root vegetables, and species of the *rubus* genus. In some embodiments, the *allium* species are selected from: onion, garlic, scallion, shallot, leek, and chives. In some embodiments, the root vegetables are selected from potatoes, carrots, yams, sweet potatoes, turnips, taro, and ginger. In some embodiments, the gourd cultivar is selected from: squash, pumpkins, cucumbers, squash, luffa, and melons. In some embodiments, melons are selected from watermelons, cantaloupe, and honeydew.

Crops of the *rubus* species can include or exclude caneberries. Caneberries can include or exclude raspberries, blackberries, and hybrids which can include or exclude loganberry, boysenberry, marionberry and tayberry. In some embodiments, the caneberries can be selected from: Loganberry (California, USA, 1883) R.xloganobaccus, Boysenberry (USA, 1920s), Olallieberry (USA, 1930s), Veitchberry (Europe, 1930s), Skellyberry (Texas, USA, 2000s), Marionberry (1956, Silvanberry, R. 'Silvan', Tayberry (Dundee, Scotland, 1979), Tummelberry, R. 'Tummel', Hildaberry (1980s), and Youngberry. In some embodiments, crops of the *rubus* genus can include or exclude: *Rubus aboriginum*—garden dewberry, *Rubus abundus, Rubus aculifer Rubus adenocaulis*—*Rubus adenophorus Rubus adenotrichos, Rubus adjacens, Rubus alaskensis, Rubus allegheniensis*—Allegheny blackberry, *Rubus alnifolius, Rubus alpinus, Rubus alter, Rubus alumnus, Rubus amplior, Rubus andrewsianus, Rubus apogaeus, Rubus aptatus, Rubus arcticus*—Arctic raspberry, *Rubus arcuans, Rubus arenicola, Rubus argutus, Rubus arizonensis*—Arizona dewberry, *Rubus armeniacus*—Himalayan blackberry, *Rubus arvensis, Rubus audax, Rubus azuayensis, Rubus baileyanus, Rubus bartonianus, Rubus bellobatus, Rubus bicknellii, Rubus biflorus, Rubus biformispinus, Rubus bifrons, Rubus bigelovianus, Rubus blanchardianus, Rubus boyntonii, Rubus burnhamii, Rubus bushii, Rubus caesius*—European dewberry, *Rubus canadensis*—Canadian blackberry, *Rubus canescens, Rubus centralis, Rubus chamaemorus*—Cloudberry, *Rubus chloocladus, Rubus clarus, Rubus cockburnianus, Rubus conanicutensis, Rubus concameratus, Rubus corchorifolius, Rubus coriifolius, Rubus coronaries, Rubus coreanus*—Bokbunja, *Rubus costaricanus, Rubus crataegifolius, Rubus cubitans, Rubus cuneifolius*—sand blackberry, *Rubus curtipes, Rubus cymosus, Rubus dalibarda, Rubus deamii, Rubus defectionis, Rubus deliciosus, Rubus densissimus, Rubus depavitus*—Aberdeen dewberry, *Rubus discolor, Rubus dissimilis, Rubus domingensis, Rubus durescens, Rubus durus, Rubus eggersii, Rubus elegantulus, Rubus ellipticus, Rubus emeritus, Rubus eriocarpus, Rubus Exeter, Rubus exsularis, Rubus fagifolius, Rubus fecundus, Rubus felix, Rubus ferrugineus, Rubus flagellaris*—northern dewberry, *Rubus flavinanus, Rubus floricomus, Rubus florulentus, Rubus fraternalis, Rubus frondisentis, Rubus frondosus, Rubus fruticosus* agg. —blackberry, *Rubus fryei, Rubus furtivus, Rubus geniculatus, Rubus geoides*—Patagonian raspberry, *Rubus glabratus, Rubus glandicaulis, Rubus glaucifolius*—San Diego raspberry, *Rubus glaucus, Rubus gnarus, Rubus grimesii, Rubus griseus, Rubus gulosus, Rubus hancinianus, Rubus hanesii, Rubus harmonicus, Rubus hawaiensis, Rubus hayata-koidzumii, Rubus heterophyllus, Rubus hispidoides, Rubus hispidus*—swamp dewberry, *Rubus hochstetterorum*—Azorean blackberry, *Rubus humistratus, Rubus huttonii, Rubus hypolasius, Rubus ictus, Rubus idaeus*—European red raspberry, *Rubus illecebrosus, Rubus immanis, Rubus impar, Rubus inclinis, Rubus inferior, Rubus Miens, Rubus insons, Rubus insulanus, Rubus invisus*—upland dewberry, *Rubus irasuensis, Rubus ithacanus, Rubus jacens, Rubus jamaicensis, Rubus junceus, Rubus kelloggii, Rubus kennedyanus, Rubus laciniatus*—cutleaf evergreen blackberry, *Rubus laegaardii, Rubus lambertianus, Rubus largus, Rubus lasiococcus*—roughfruit berry, *Rubus latens, Rubus lawrencei, Rubus leucodermis*—whitebark raspberry or western raspberry, *Rubus leviculus, Rubus liebmannii, Rubus linkianus, Rubus longii, Rubus macraei, Rubus macrogongylus, Rubus macrophyllus, Rubus macvaughii, Rubus maniseesensis, Rubus meracus, Rubus michiganensis, Rubus mirus, Rubus miser, Rubus missouricus, Rubus mollior, Rubus moluccanus, Rubus montensis, Rubus multifer, Rubus multiformis, Rubus multispinus, Rubus navus, Rubus nefrens, Rubus nelsonii, Rubus nebulosus, Rubus neomexicanus, Rubus nepalensis, Rubus nigerrimus, Rubus nivalis, Rubus niveus, Rubus notatus, Rubus novanglicus, Rubus noveboracus, Rubus novocaesarius, Rubus obsessus, Rubus obvius, Rubus occidentalis*—black raspberry, *Rubus odoratus*—flowering raspberry, *Rubus oklahomus, Rubus originalis, Rubus ortivus, Rubus ostryifolius, Rubus paganus, Rubus palmeri, Rubus paludivagus, Rubus parcifrondifer, Rubus parlinii, Rubus particeps, Rubus particularis, Rubus parviflorus*—thimbleberry, *Rubus parvifolius*—small-leaf bramble (Australia), *Rubus pascuus, Rubus pedatus, Rubus pensilvanicus*—Pennsylvania blackberry, *Rubus pergratus, Rubus permixtus, Rubus pernagaeus, Rubus persistens, Rubus perspicuous, Rubus pervarius, Rubus philadelphicus, Rubus philyrophyllus, Rubus phoenicolasius*—wineberry, *Rubus pittieri, Rubus plexus, Rubus plicatifolius, Rubus plicatus, Rubus plus, Rubus porter, Rubus positivus, Rubus prestonensis, Rubus pringlei, Rubus probabilis, Rubus probativus, Rubus probus, Rubus prosper, Rubus provincialis, Rubus pubescens*—dwarf red blackberry, *Rubus pugnax, Rubus pumilus, Rubus quaesitus, Rubus racemiger, Rubus randolphiorum, Rubus recurvans, Rubus recurvicaulis, Rubus reflexus*—rusty-hair raspberry, *Rubus regionalis, Rubus repens, Rubus riograndis, Rubus roribaccus, Rubus rosa, Rubus rosaries, Rubus roseus, Rubus rosifolius, Rubus rossbergianus, Rubus russeus, Rubus rydbergianus, Rubus saltuensis, Rubus sapidus, Rubus saxatilis*—stone bramble, *Rubus scambens, Rubus scandens, Rubus sceleratus, Rubus schiedeanus, Rubus schoolcraftianus, Rubus segnis, Rubus semisetosus, Rubus setosus, Rubus severus, Rubus sewardianus, Rubus sieboldii, Rubus sierra, Rubus signatus, Rubus sons, Rubus spectabilis*—salmonberry, *Rubus spectatus, Rubus steelei, Rubus stipulates, Rubus strigosus*—American red raspberry, *Rubus superbus, Rubus suppar, Rubus suus, Rubus tardatus, Rubus thibetanus, Rubus tholiformis, Rubus tomentosus, Rubus trichomallus, Rubus tricolor, Rubus trifidus*—Japanese blackberry, *Rubus trifrons, Rubus trilobus, Rubus trivialis, Rubus tuerckheimii, Rubus tygartensis, Rubus ucetanus, Rubus uhdeanus, Rubus ulmifolius, Rubus uniformis, Rubus ursinus*—trailing blackberry, *Rubus uvidus, Rubus variispinus, Rubus velox, Rubus verae-crucis, Rubus vermontanus, Rubus vestitus, Rubus vigil, Rubus vigilis, Rubus vigoratus, Rubus vulcanicola, Rubus vulgaris, Rubus weatherbyi, Rubus whartoniae, Rubus wheeleri*, and *Rubus wisconsinensis*.

EXAMPLES

Example 1

Anaerobic food waste digestate comprising about 100 kg N/d was processed by the methods described herein into a form of ammonia amenable for scrubbing with a strong acid to produce an aqueous ammonium solution.

The digestate consistency was similar to liquid water but contains a large amount of fine solid material. The physical and chemical characteristics of the digestate samples are summarized in Table 1.

TABLE 1

Summary of liquid ammonium waste stream (digestate) physical and chemical properties

| Parameter | Unit | Value[a] |
|---|---|---|
| BOD, soluble | mg/L | 3500 |
| Alkalinity | mg $CaCO_3$/L | 15,000-20,000 |
| Ammonium N | mg N/L | 2100-4000 |
| Phosphate P | mg P/L | 100 |
| Sodium | mg/L | 700 |
| TS | % | 2.1 |
| VSS | mg/L | 5800 |
| TSS | mg/L | 6600 |
| EC | mS/cm | 3.4 |

[a]Range given when multiple values are available

Process Description

The process developed for nutrient recovery from digestate and other concentrated waste streams and used in this study is shown schematically on FIG. 2. The raw digestate is delivered to the top of the distillation column and flows vertically down the column through a series of trays or stages. Air and steam are injected in the bottom of the column and flow upwards, counter to the feed flow. As the feed moves through the column, carbon dioxide vapor is released, causing the pH of the liquid to rise. With the increased pH, ammonia is released from solution and swept out of the column. The vapor is absorbed in an acid scrubber using sulfuric acid, resulting in a strong ammonium sulfate solution. The treated bottoms drain to waste. In some embodiments, the vapor can be absorbed with a certifiably Organic acid, preferably a carbon-organic acid, wherein the resulting ammonium salt solution is certifiably Organic for use in organic agriculture.

Loading parameters applied for the test samples are summarized in Table 2.

TABLE 2

Summary of design and loading parameters used for process optimization evaluation.

| Parameter | Unit | Value |
|---|---|---|
| Fixed parameters | | |
| Column Diameter | in. (mm) | 5 (125) |
| Column Height | ft (mm) | 10 (3000) |
| Stages | | 11 |
| Stage spacing | in. (mm) | 7.5 (190) |
| Feed rate | gal/min (L/min) | 0.2 (0.7) |
| Pressure at bottom | in. (bar) | 25 (0.07) |
| Variable parameters | | |
| Caustic addition | g/L | 0, 4, 8 |
| Column temperature near top | °F. (°C.) | 120-190 (50-90) |
| Steam rate | lb/h (mL/min) | 7-20 (60-150) |
| Air rate | $ft^3$/min (L/min) | 5-5 (140-420) |

Column Operations

Operational problems developed and were resolved on several occasions. The primary issues were column flooding, boil over, trap blowout, and gradual loss of vapor flow. The rationale and resolution for each of these items is described below in Table 3.

TABLE 3

Summary of operational problems and remedies

| Condition | Cause | Remedy |
|---|---|---|
| Column flooding | Internal liquid seals not deep enough, allowing vapor to travel through downcomers | Startup procedure developed to form liquid seals prior to vapor flow (see below). |
| Boil over | Temperature exceeded about 92° C. | Temperature controller used to modulate steam flow, maintaining column temperature. |
| Trap blowout | Pressure in column exceeded water column height of bottoms liquid trap | Previously, air and steam flows were adjusted as needed to keep stable pressure. Modified design uses metered output and cannot blow out. |
| Gradual loss of vapor flow | Startup transient resulting in low temperature higher in column. Condition led to boil over when not corrected immediately. | Column temperatures and vapor flow rate observed, and extra air pressure applied as necessary to re-establish vapor flow (simultaneously distributing steam up the column). |

Based on the information presented in Table 3, the following procedure was found to be effective in eliminating process upset during startup:
1. Inject steam into the column until heated sufficiently
2. Turn off steam
3. Feed plain water until all internal liquid seals have formed properly
4. Ensure bottoms tank/trap is at operating level
5. Begin feed, air, and steam injection
6. Monitor column parameters for steady state operation.

Ammonium Removal/Nutrient Recovery

The optimization testing of the distillation column was focused on evaluating operation at selected temperatures (50, 60, 70, 80, and 90° C. at the upper column location) and three levels of feed caustic addition (0, 4, and 8 g NaOH/L). The results from the test conditions are summarized in FIG. 3. As shown on FIG. 3, the performance improved with increasing temperature and caustic addition. However, it was noted that the ammonium removal performance was not improved with caustic addition for operation at 90° C. As shown on FIG. 3, several trends are apparent in the data obtained from the optimization testing. The ammonium, alkalinity, and conductivity present in the feed solution were increasingly reduced at higher operating temperatures, as constituents volatilize. The volatile constituents are entrained with the vapor phase and removed at the top of the column and condensed.

Based on the results of the optimization testing, an operating temperature of 85 to 90° C. without caustic addition was selected for further extending testing. The data presented in Table 4 was obtained from the extended operation study:

TABLE 4

Summary of 20 Apr. 2018 extended study operation data.

| Parameter | Unit | Value |
| --- | --- | --- |
| Feed rate | gal/min (L/min) | 0.18 (0.67) |
| Temp - feed | ° F. (° C.) | 77 (25) |
| Temp - head | ° F. (° C.) | 167 (75) |
| Temp - upper column | ° F. (° C.) | 185 (85) |
| Temp - lower column | ° F. (° C.) | 194 (90) |
| Temp - bottoms | ° F. (° C.) | 183 (84) |
| Temp - ambient | ° F. (° C.) | 91 (33) |
| Steam rate | lb/h (mL/min) | 19.5 (148) |
| Bottoms rate | gal/min (L/min) | 0.22 (0.82) |
| Air rate | ft$^3$/min (L/min) | 5 (140) |
| Pressure at bottom | in. (bar) | 25 (0.07) |
| Acid addition | mL (acid)/L (feed) | 4.2 |

Fouling and Scale Removal

Figure 4:
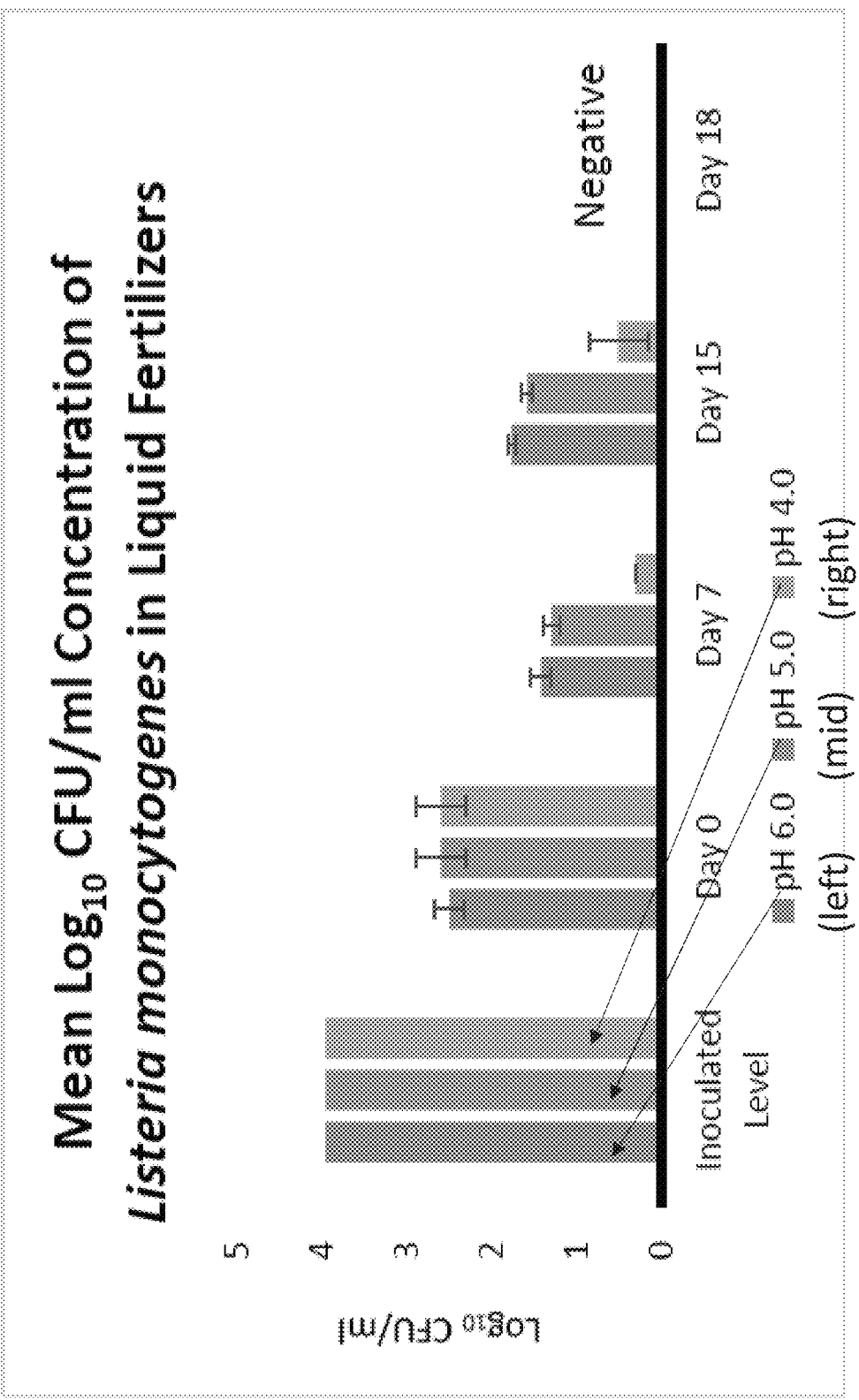
FIG. 4 shows the mean Log 10 CFU/ml Log Transformed Concentration of *Listeria monocytogenes* in Liquid fertilizers (LOD=0.3 log 10 CFU/ml). Note that in all bargraphs depicted herein, the left most bar represents the pH 6 condition, the middle bar represents the pH 5 condition, and the rightmost bar represents the pH 4 condition.

Deposits were observed after approximately 2000 L and 3000 L of total throughput. After 2000 L (FIG. 4A), deposits were removed by flushing with water only (FIG. 4B). After another 1000 L of throughput (FIG. 4C), three chemical treatments were applied: 10% H2SO4, 35% $H_2O_2$, and 10% NaOH. The chemical treatments were applied with a pipette and left in place for 10 min before rinsing (FIG. 4D). Based on this preliminary testing, sulfuric acid appeared to remove the most scale and was therefore pursued for a scale-up experiment.

Scale Up Trial Run

Based on the successful operation during the optimization study, and confirmation of stable operation in the extended study, the parameters given in Table 5 are recommended for a full-scale pilot evaluation.

TABLE 5

Summary of scale-up date based on scaled-up extended study operation.*

| Parameter | Unit | Value |
| --- | --- | --- |
| Loading | gal/ft$^2$ · min | 1.5 |
| Diameter | ft | 2 |
| Operating temp | ° C. | 85 |
| Duty cycle | h/d | 24 |
| Feed rate | gal/d | 7500 |
| Steam rate | lb/h | 585 |
| Air rate | ft$^3$/min at 30 in. WC | 150 |
| Caustic rate | — | optional |
| Ammonium N recovered | lb/d as ammonium sulfate | 230 |

*Note that a scale-up factor of 30 was applied to the operation on the extended study to estimate the reported values.

Example 2. Characterization of Aqueous Ammonium Solutions

Aqueous ammonium solutions were made by the processes and systems described herein, wherein the acid source and concentration were varied to study the impact on product pH and total nitrogen levels. Starting in July, 2019 pilot trial runs were conducted using citric acid and a blend of acetic and citric acid, as representative certifiably Organic weak acids. Acetic acid was available from an organically available source at concentrations up to 30% wt. Citric acid (dry powder) was also available from a certifiably Organic available source. The characterization of the trial runs is summarized in Table 6 below. Concentrations above 900 g/L citric acid were obtained by heating dissolution water to approximately 70 C.

TABLE 6

Summary of Characterization of Representative Embodiments of the Invention

| Run # | Date | Acid | Acid Concentration (g/L) | Product pH | Product Total Nitrogen (wt %) |
| --- | --- | --- | --- | --- | --- |
| 1 | Aug. 2, 2019 | Acetic + Citric | 800 | | 5.94 |
| 2 | Sep. 15, 2019 | Citric | 600 | 6.24 | 7.40 |
| 3 | Sep. 20, 2019 | Citric | 600 | 5.72 | 6.70 |
| 4 | Sep. 22, 2019 | Citric | 900 | 6.75 | 9.53 |
| 5 | Oct. 4, 2019 | Citric | 900 | 4.25 | 4.27 |
| 6 | Oct. 5, 2019 | Citric | 900 | 4.75 | 4.80 |
| 7 | Oct. 6, 2019 | Citric | 900 | 5.25 | 6.35 |

High final product nitrogen concentrations are desirable to minimize transportation costs and allow for blending with other products to a higher ultimate concentration. If resulting N concentrations are lower than desired, evaporation can be used to raise the N concentration. Solar drying/evaporation was used to demonstrate this with samples up to the point of crystallization/precipitation. In some embodiments, dehydration to dryness could be performed to increase the N concentration. Trial runs (not shown) with evaporation have increased the N concentration from 4-6% as-produced to about 10% (wt) after concentrating using the methods described herein. Further evaporation may initiate precipitation and can be carried to dryness to produce a solid organic ammonium product using several established drying technologies.

Final product pH selected greatly impacts acid use efficiency, product N concentration, and acid costs, as shown by the series of tests in October (Runs 5-8). The higher the pH, the higher the final N concentration, with N concentrations ranging from 8-10 (wt) %. It was found that at N concentrations higher than 10 (wt) % at room temperature, the salt would precipitate out of solution.

Trial runs using sulfuric acid as the scrubbing acid form ammonium sulfate solutions, as discussed in Example 1.

A blended fertilizer product with total N=3.94% was produced using the 8/2/2019 ammonium acetate/citrate product (N=5.94%) (Run 1) by blending with H2H 3-2-1 Organic (N=2.74%) at 50% by weight.

A blended fertilizer product with total N=5.5% and pH=5.7 was produced using the 9/22/2019 ammonium citrate product (N=9.53%) (Run 4) by blending with H2H 3-2-1 organic (N=2.75%) at 40% by weight. The laboratory analysis for macro and micronutrients and metals is presented in the Table 7 below:

TABLE 7

Characterization of one batch of blended ammonium-organic fertilizer.

| Analysis | Level Found | Units | Reporting Limit |
|---|---|---|---|
| Moisture (vacuum oven - 70° C.) | 53.07 | % | 0.01 |
| Dry matter | 46.93 | % | 0.010 |
| Protein (crude) | 29.9 | % | 0.05 |
| Fat (acid hydrolysis) | 5.0 | % | 0.1 |
| Ash | 2.70 | % | 0.1 |
| Nitrogen (total) | 5.50 | % | 0.01 |
| Phosphate (available P2O5) | 1.2 | % | 0.1 |
| Potash (K2O) (soluble) | 0.74 | % | 0.01 |
| Boron (total) | n.d. | ppm | 100 |
| Sulfur (total) | 0.45 | % | 0.05 |
| Phosphorus (total) | 0.56 | % | 0.05 |
| Potassium (total) | 0.71 | % | 0.05 |
| Magnesium (total) | 0.16 | % | 0.01 |
| Sodium (total) | 0.17 | % | 0.01 |
| Iron (total) | 65.4 | ppm | 50.0 |
| Calcium (total) | 0.09 | % | 0.01 |
| Manganese (total) | n.d. | ppm | 20.0 |
| Zinc (total) | 48.9 | ppm | 20.0 |
| Copper (total) | n.d. | ppm | 20.0 |
| Ammonium nitrogen (total) | 4.04 | % | 0.01 |
| Loss on ignition (OM) | 42.4 | % | 0.01 |

The methods used to determine the analysis are described below.

Vacuum Moisture: Samples are placed in aluminum tins and dried in a 60 C or 70 C vacuum oven (20-25 mm Hg) for 4 or 18 hours, with or without digest pure quartz sand. Loss in mass is reported as moisture.

Elemental combustion Nitrogen, Carbon, Hydrogen: Samples are ground to a fine, homogenous consistency and a small amount weighed and introduced into the instrument. The sample is burned in the presence of oxygen to release gases such as carbon dioxide, nitrogen, and hydrogen and the levels of a specific gas determined and reported.

Available Phosphate: The available phosphate is determined by solubilizing the sample in a citrate solution and then measuring the citrate soluble portion of phosphate on a spectrophotometer.

Nitrogen: The sample is placed in a combustion instrument and the amount of nitrogen is obtained. The nitrogen value is multiplied by a factor of 6.25 and that value reported as crude protein.

Minerals content: Sample analysis involves moving the sample extract into the ICP where it is nebulized and introduced into the high temperature plasma which energizes the electrons of the dissolved minerals/metals. As the energized electrons of the minerals/metals return to ground state, energy is released as light. The emitted wavelength(s) and light intensities are used to identify and quantitate the minerals/metals in the sample.

Acid Hydrolysis Fat: A sample is treated with ethanol and hydrochloric acid to help release fat in the sample. Separate treatments of ethyl ether and petroleum ether is used to extract the fat and the ethers collected in a pre-weighed beaker. The ether is evaporated and dried at 70 degrees C. to remove remaining ether and moisture and the material remaining in the beaker is reported as "fat".

Ash: The sample is weighed and placed in a muffle furnace at 600° C. After a period of time, the sample is removed and the remaining material weighed and reported as ash. Moisture and organic material is driven off.

Ammonia: A sample is placed in a distillation tube and a standard base added to convert ammonium to ammonia. The ammonia is distilled into an acid solution. The acid solution is titrated with a standard acid.

Loss on Ignition: A sample is weighed placed in a vacuum drying oven to drive off the moisture and re-weighed. The sample is then placed in a muffle furnace at 550 degrees C., cooled, and re-weighed. The residue remaining is the ash and the mass lost is the volatile matter.

Example 3: Pathogen Destruction in Presence of Blended Nitrogen-Enriched Organic Fertilizers Aqueous ammonium solutions produced by the methods and systems described herein were blended with fresh food waste hydrolysates to yield liquid fertilizer products with final pH values of 4.0, 5.0, and 6.0 (with a 5-1-1 N-P-K ratio) ("liquid fertilizers"). These liquid fertilizer products were tested for pathogen viability. In some embodiments, the pH of the blended liquid organic fertilizer can range from 3.5 to 6.5.

Materials and Methods.

The 5-1-1 blended organic fertilizers were prepared by mixing ammonium solution made by the methods described herein (~40 wt. % ammonium (at 9.5% N wt concentration in the pre-mixed solution) with 60 wt. %, of fresh food waste hydrolysate ("H2H 3-2-1", comprising 2.75% N wt concentration) as the organic fertilizer, to produce a 5.5% N 5-1-1 blended organic fertilizer with pH ~5.7-6.0. Citric acid was used to lower the pH to 5 and 4 for the other test conditions. In some embodiments, the range of ammonium solution to reduce pathogen levels in organic fertilizer can range from 15 wt. % to 99 wt. %. The concentration of nitrogen (N) in the ammonium solutions used to reduce pathogen levels can be from 4 to 11 wt. % in the pre-blended ammonium. In some embodiments, the relative weight of the ammonium solution can range from 15% to 99% wt. In some embodiments, the concentration of the nitrogen in the organic fertilizer can range from 1 wt. % to 50 wt. %. In some embodiments, the organic fertilizer can be selected from manures, animal renders, bat guano, bone meal, feather meal, spent grape must, spend mash, dairy waste, or fermented, hydrolyzed, or anaerobic digests thereof.

The tested pathogens were: *Salmonella* sp., *Listeria monocytogenes*, and *E. coli* O157:H7.

Preparation of Target Inocula.

To properly assess the fate of the above three pathogens in the liquid fertilizers, a consortia of three strains were used for the preparation of cocktails for each organism as listed below for the inoculation of the fertilizers.

For *Salmonella enterica* Spp.:
*Salmonella* Enteritidis ATCC Strain #13076
*Salmonella* Typhimurium ATCC Strain #14028
*Salmonella* Newport ATCC Strain #6962
For *Listeria monocytogenes*:
*Listeria monocytogenes* ATCC 19115, Serotype 4b,
*Listeria monocytogenes* ATCC 19114, Serotype 4a,
*Listeria monocytogenes* ATCC 7644, Serotype 1/2c
For *E. coli* O157:H7:
*Escherichia coli* O157:H7 ATCC 35150,
*Escherichia coli* O157:H7 ATCC 43895,
*Escherichia coli* O157:H7 ATCC 700599

Fresh cultures of each strain were prepared by streaking frozen stock cultures (−80° C.) onto Tryptic Soy Agar (TSA; Becton, Dickinson and Company, Franklin Lakes, N.J.) and were incubated at 35±2° C. for 21±3 h. An isolated colony from each TSA plate was inoculated into a fresh 10 ml tube of Tryptic Soy Broth (TSB; Becton, Dickinson and Company) and incubated at 35±2° C. for 21±3 h. Aliquots of the incubated TSB culture of each strain were harvested by centrifugation at maximum speed for 10 min in a Model 16K Microcentrifuge (Bio-Rad Laboratories, Inc., Hercules, Calif.). Supernatants were removed, and the pelleted cells were re-suspended in Butterfield's Phosphate Buffer (BPB; Made In-House from Various Ingredients). The re-suspended cells in BPB were then centrifuged once more, followed by removal of supernatants. Re-suspension of the pelleted cells in BPB provided a cell concentration of ~9.0 log 10 CFU/ml. An aliquot of this suspension were combined with equal volumes of the others to make a three-strain cocktail at ~9.0 log 10 CFU/ml. This three-strain cocktail was vortexed to distribute each strain evenly throughout the cocktail. The three-strain cocktail was serially-diluted to a concentration of ~6.0 log 10 CFU/ml to create a cell suspension that was used to further inoculate the liquid fertilizers.

Inoculation of Liquid Fertilizers

After serially-diluting the three-strain cocktail to ~6.0 log 10 CFU/ml (prepared as described above in Section 4.2), a 400 ml aliquot of liquid fertilizer at each pH level was inoculated i.e. 400 ml at pH level 6.0, 5.0, and 4.0 with cocktails of *Salmonella enterica* Spp., 400 ml at pH level 6.0, 5.0, and 4.0 with cocktails of *Listeria monocytogenes*, 400 ml at pH level 6.0, 5.0, and 4.0 with cocktails of *E. coli* O157:H7. For inoculation, 3 ml of the inoculum culture was added to each 400 ml portion of the samples. Post inoculation, each sample portion was well mixed and portioned out into volumes of 25 ml into 15 sample units in 50 ml centrifuge tubes to be enumerated at days 0, 7, and 15.

Enumeration of Pathogens

For enumeration of the target microorganisms, three samples inoculated with each type of target pathogen at each pH level were retrieved post inoculation on Days 0, 7, and 15. In brief, 25 ml of BPB was added at 1/2 dilution to each 25 ml portion of the sample. The samples were vortexed to obtain a homogenous solution and serial dilutions were performed using BPB blanks. 100 µl of an appropriate dilution was plated onto Xylose Lysine Deoxycholate (XLD), Sorbitol MacConkey Agar supplemented with Cefixime and Tellurite (CT-SMAC), and MOX (Modified Oxford) (Neogen Accumedia, Lansing, Mich.) for the enumeration of *S. enterica* spp., *E. coli* O157:H7, and *L. monocytogenes*, respectively. XLD and CT-SMAC plates were incubated at 35° C. for 24±2 h, whereas MOX and BPA agar plates were incubated at 35° C. for 48±2 h. After the incubation period was complete, the plates were removed from the incubator and colonies displaying typical morphology were counted on their respective agar plates. These plate count values were then multiplied by their corresponding dilution factors in order to obtain the concentration of the respective challenge organism in CFU/g for that particular sample.

Detection of Pathogens in Liquid Fertilizers

Upon reaching low levels for the pathogens in the liquid fertilizers at Day 15, three inoculated samples for each pathogen at each pH level were tested for the presence/absence of the inoculated target pathogens using Food and Drug Administration Bacteriological Analytical Method (FDA BAM) protocol on Day 18. The FDA BAM method is referenced below (1). In brief, for *Salmonella* detection, the samples were enriched in 225 ml of Universal Pre-enrichment Broth (UPB) and incubated at 35° C. for 24 h. Post enrichment, the samples were transferred to TT (Tetrathionate) and RV (Rappaport Vassiliadis) broths. Upon secondary enrichment, the samples were streaked on XLD agar plates and observed for typical colonies. For *Listeria monocytogenes*, the samples were enriched into 225 ml of BLEB (Buffered *Listeria* Enrichment Broth supplemented with Pyruvate) and were incubated at 30° C. for 48 h. These samples were streaked on MOX agar plates for observation of typical *Listeria* colonies at 24 and 48 h post enrichment. For *E. coli* O157:H7 detection, the samples were enriched into 225 ml of modified Buffered Peptone Water (mBPWp with Pyruvate) and incubated at 35° C. for 24 h. Post enrichment, the samples were prepared to run detection analysis using PCR method.

Analysis of Log Reduction and Result Reporting

All CFU/g values were entered into a spreadsheet and transformed to their corresponding log 10 CFU/g values. Average log transformed values were obtained from three samples for each pathogen type. When cell concentrations reached below the limit of detection, pathogens were tested for the presence/absence and are reported are 'Negative' when not detected.

Results

Figure 5:
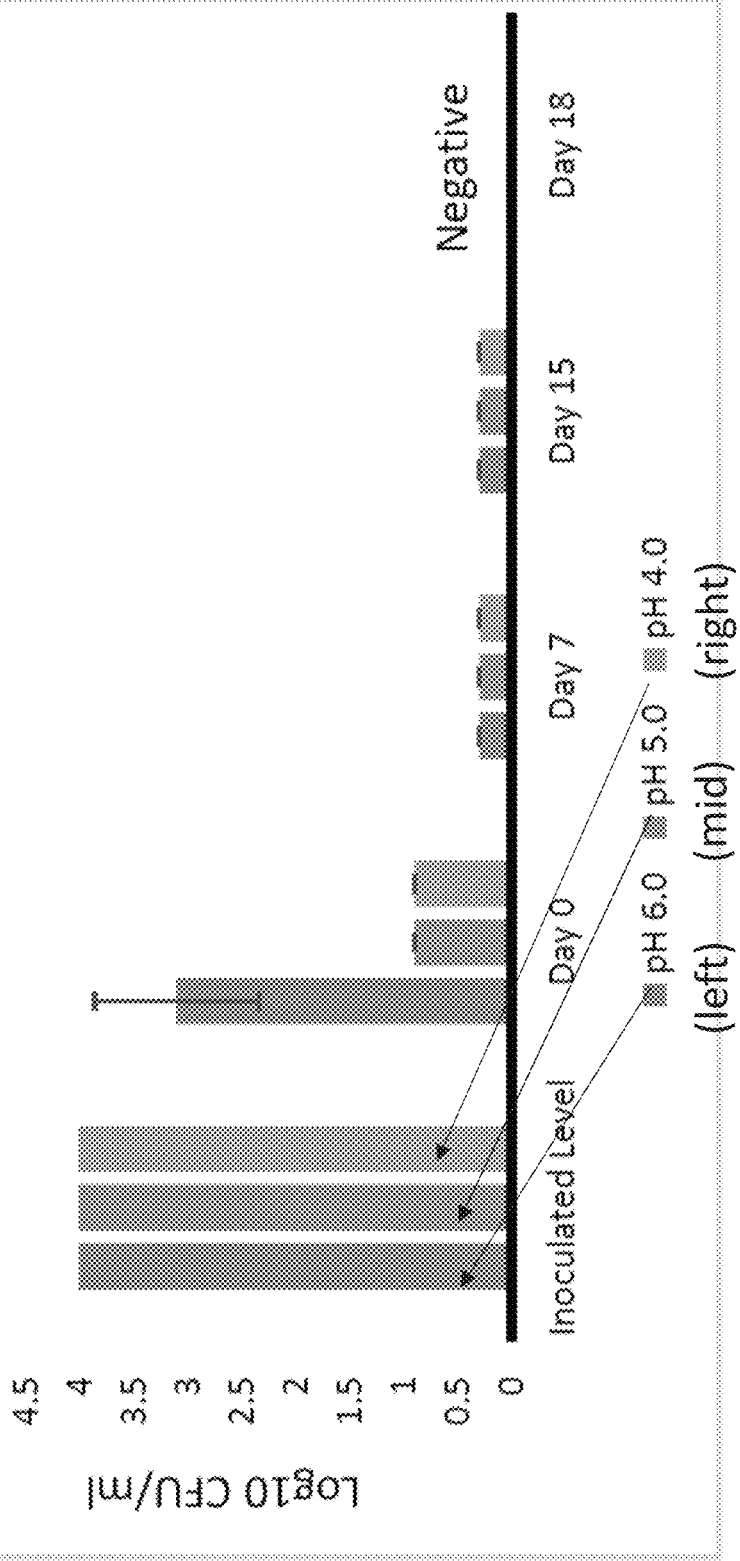
FIG. 5 shows the mean Log 10 CFU/ml Log Transformed Concentration of *E. coli* O157:H7 in Liquid fertilizers (LOD=0.9 log 10 CFU/ml on Day 0, LOD=0.3 log 10 CFU/ml on other days).

The liquid fertilizers at pH levels of 6.0, 5.0, and 4.0 were inoculated separately with cocktails of *Listeria monocytogenes* (Table 1, FIG. 1), *E. coli* O157:H7 (Table 9, FIG. 5) and *Salmonella enterica* sp. (Table 10, FIG. 6). Three samples were enumerated at Days 0, 7, and 15. The calculated inoculum levels were 3.96, 4.02, and 3.77 log 10 CFU/ml for *Listeria monocytogenes*, *E. coli* O157:H7, and *Salmonella* sp., respectively, in the liquid fertilizers at all pH levels post inoculation. However, the counts at Day 0 showed average log transformed levels below the inoculated level, displaying potential die-off of the pathogens in the liquid fertilizers upon inoculation.

Figure 6:
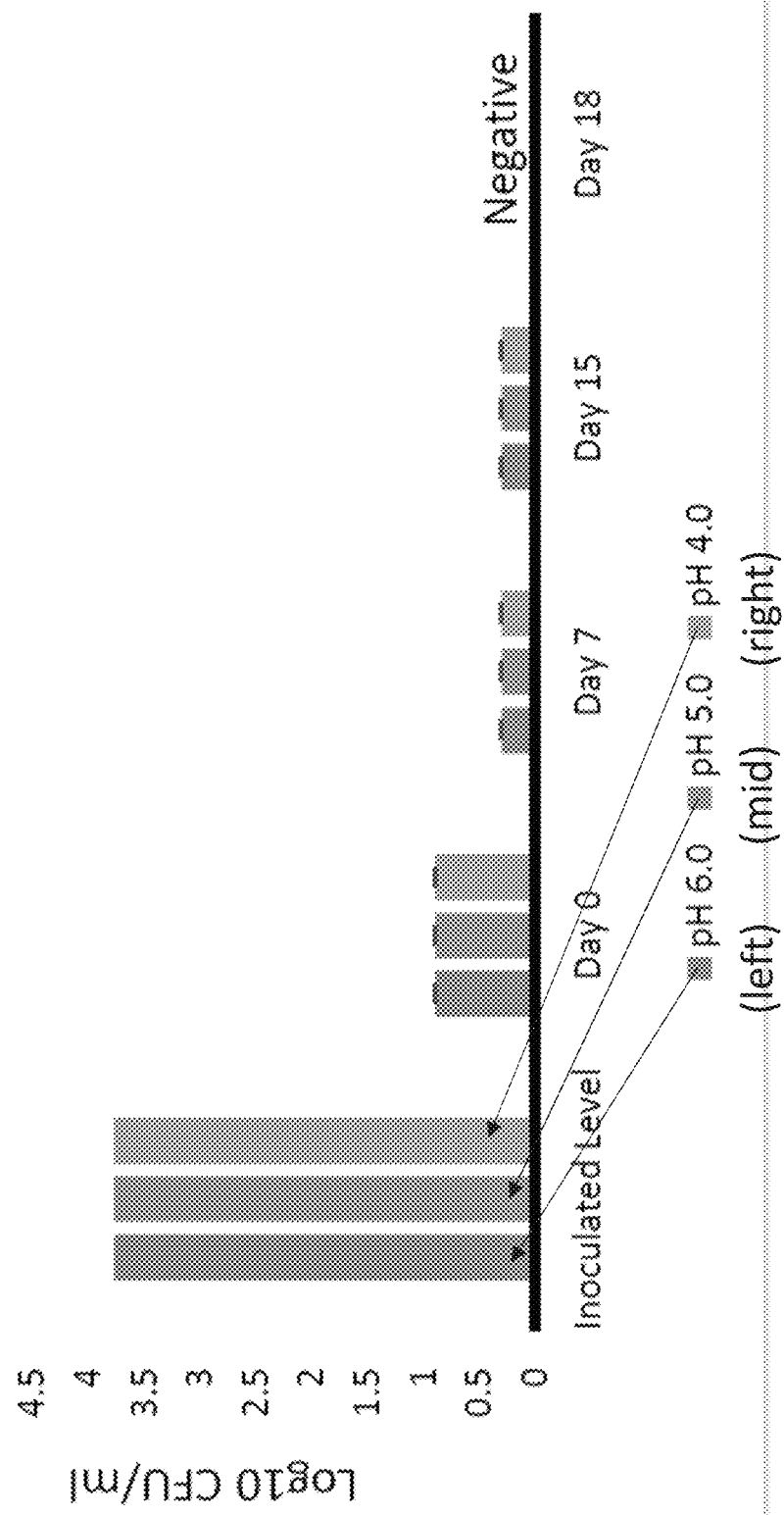
FIG. 6 shows the mean Log 10 CFU/ml Log Transformed Concentration of *E. coli* O157:H7 in Liquid fertilizers (LOD=0.9 log 10 CFU/ml on Day 0, LOD=0.3 log 10 CFU/ml on other days).

Samples inoculated with *Salmonella* sp, showed no counts at the limit of detection (LOD) of 0.9 log 10 CFU/ml of Day 0 in liquid fertilizers at all pH levels potentially due to rapid die-off (Table 10, FIG. 6). For *E. coli* O157:H7 and *Listeria monocytogenes*, log transformed cell counts of 3.11±0.76 and 2.50±0.17 log 10 CFU/ml, was observed on Day 0 post inoculation. At Days 7 and 15, cell concentrations below the limit of detection of 0.3 log 10 CFU/ml was observed for both *Salmonella* sp, and *E. coli* 0157 in liquid fertilizers at all pH levels. For *Listeria monocytogenes*, cell concentrations below the limit of detection was observed only in liquid fertilizers at pH level of 4.0 (Table 8, FIG. 4).

On Day 18, three samples at each pH level inoculated with each targeted pathogen type was tested for the presence or absence of the targeted pathogens. The tests showed that no samples were positive for these inoculated pathogens in liquid fertilizers at all pH levels (Tables 8, 9, and 10).

TABLE 8

Mean Log Transformed (Log10 CFU/ml) Concentrations of *Listeria monocytogenes* in Liquid Fertilizers Inoculated at 3.96 log10 CFU/ml

| | Liquid Fertilizer at pH 6.0 | | | | Liquid Fertilizer at pH 5.0 | | | | Liquid Fertilizer at pH 4.0 | | | |
|---|---|---|---|---|---|---|---|---|---|---|---|---|
| Sample | Day 0 | Day 7 | Day 15 | Day 18 | Day 0 | Day 7 | Day 15 | Day 18 | Day 0 | Day 7 | Day 15 | Day 18 |
| 1 | 2.60 | 1.28 | 1.79 | Negative | 2.60 | 1.38 | 1.60 | Negative | 2.60 | <0.3 | <0.3 | Negative |
| 2 | 2.60 | 1.49 | 1.70 | Negative | 2.90 | 1.28 | 1.51 | Negative | 2.90 | <0.3 | 0.90 | Negative |
| 3 | 2.30 | 1.48 | 1.78 | Negative | 2.30 | 1.20 | 1.62 | Negative | 2.30 | <0.3 | <0.3 | Negative |
| Average | 2.50 | 1.42 | 1.76 | Negative | 2.60 | 1.29 | 1.58 | Negative | 2.60 | 0.30 | 0.50 | Negative |
| Std. dev | 0.17 | 0.12 | 0.05 | N/A | 0.30 | 0.09 | 0.06 | N/A | 0.30 | 0.00 | 0.35 | N/A |

Note:
Counts below the Limit of detection of <0.3 or 0.9 log10 CFU/ml was replaced with 0.3 or 0.9 log10 CFU/ml for the calculation of averages. 'Negative' results show that pathogen was not detected.

TABLE 9

Mean Log Transformed (Log10 CFU/ml) Concentrations of *E. coli* O157:H7 in Liquid Fertilizers Inoculum at 4.02 log10 CFU/ml

| | Liquid Fertilizer at pH 6.0 | | | | Liquid Fertilizer at pH 5.0 | | | | Liquid Fertilizer at pH 4.0 | | | |
|---|---|---|---|---|---|---|---|---|---|---|---|---|
| Sample | Day 0 | Day 7 | Day 15 | Day 18 | Day 0 | Day 7 | Day 15 | Day 18 | Day 0 | Day 7 | Day 15 | Day 18 |
| 1 | 3.82 | <0.3 | <0.3 | Negative | <0.90 | <0.3 | <0.3 | Negative | <0.90 | <0.3 | <0.3 | Negative |
| 2 | 3.20 | <0.3 | <0.3 | Negative | <0.90 | <0.3 | <0.3 | Negative | <0.90 | <0.3 | <0.3 | Negative |
| 3 | 2.30 | <0.3 | <0.3 | Negative | <0.90 | <0.3 | <0.3 | Negative | <0.90 | <0.3 | <0.3 | Negative |
| Average | 3.11 | 0.30 | 0.30 | Negative | 0.90 | 0.30 | 0.30 | Negative | 0.90 | 0.30 | 0.30 | Negative |
| Std. dev | 0.76 | 0.00 | 0.00 | N/A | 0.00 | 0.00 | 0.00 | N/A | 0.00 | 0.00 | 0.00 | N/A |

Note:
Counts below the Limit of detection of <0.3 or 0.9 log10 CFU/ml was replaced with 0.3 or 0.9 log10 CFU/ml for the calculation of averages. 'Negative' results show that pathogen was not detected.

TABLE 10

Mean Log Transformed (Log10 CFU/ml) Concentrations of *Salmonella enterica* sp. in Liquid Fertilizers Inoculum Level 3.77 log10 CFU/ml

| | Liquid Fertilizer at pH 6.0 | | | | Liquid Fertilizer at pH 5.0 | | | | Liquid Fertilizer at pH 4.0 | | | |
|---|---|---|---|---|---|---|---|---|---|---|---|---|
| Sample | Day 0 | Day 7 | Day 15 | Day 18 | Day 0 | Day 7 | Day 15 | Day 18 | Day 0 | Day 7 | Day 15 | Day 18 |
| 1 | <0.90 | <0.3 | <0.3 | Negative | <0.90 | <0.3 | <0.3 | Negative | <0.90 | <0.3 | <0.3 | Negative |
| 2 | <0.90 | <0.3 | <0.3 | Negative | <0.90 | <0.3 | <0.3 | Negative | <0.90 | <0.3 | <0.3 | Negative |
| 3 | <0.90 | <0.3 | <0.3 | Negative | <0.90 | <0.3 | <0.3 | Negative | <0.90 | <0.3 | <0.3 | Negative |
| Average | 0.90 | 0.30 | 0.30 | Negative | 0.90 | 0.30 | 0.30 | Negative | 0.90 | 0.30 | 0.30 | Negative |
| Std. dev | 0.00 | 0.00 | 0.00 | N/A | 0.00 | 0.00 | 0.00 | N/A | 0.00 | 0.00 | 0.00 | N/A |

Note:
Counts below the Limit of detection of <0.3 or 0.9 log10 CFU/ml was replaced with 0.3 or 0.9 log10 CFU/ml for the calculation of averages. 'Negative' results show that pathogen was not detected.

Conclusion: The liquid fertilizer at pH levels of 6.0, 5.0 and 4.0 were not found to support the survival of the targeted pathogens during storage at room temperature. In addition, there was a rapid die-off observed for *Salmonella* in the liquid fertilizers at all pH levels. For *E. coli* O157:H7, counts below the limit of detection were observed within a week. Population levels of *Listeria monocytogenes* also decreased steadily over time. Low population levels were still observed for *Listeria monocytogenes* at day 15, specifically at pH levels of 6.0 and 5.0. However, on day 18 when tested following the FDA BAM method as referenced below, the target pathogens were not detected in the liquid fertilizers at the three pH levels. It is believed that the pathogen destruction is due to the high free ammonium and acid concentrations in the liquid fertilizers.

Example 4. Use of Blended Nitrogen-Supplemented Organic Fertilizers to Increase Crop Yield Tomato plants are grown in a controlled field environment and are treated with (1) growers standard fertilizer (GS) and 100% water; or (2) a 50:50 blend of H2H (fresh food hydrolysate) and a 8% aqueous ammonium salt solution which is made by the methods described herein. The protocol can include sub-sampling of the crops with multiple replications. The plants are treated with Growers Standard practices with the exception that part of the field receives five applications of 10 gallons per acre of H2H per application. The results are expected to demonstrate that the blend of H2H with aqueous ammonium salt solution can sustain, if not exceed, crop yields as measured by number and/or weight of tomatoes per acre. Additional metrics including improved crop vigor, produce quality, and marketable yield are also expected to increase for the blended fertilizer solution compared to the control.

In some embodiments, this disclosure provides for the following:

A1. A process for producing a non-synthetic ammonium salt composition from liquid organic waste streams comprising ammonium, the process comprising the steps of:
(a) providing a liquid organic waste stream comprising dissolved ammonium (ammonium waste stream),
(b) optionally separating biogas from the ammonium waste stream to yield debiogased ammonium waste stream, wherein the biogas comprises one or a plurality of gases selected from: methane ($CH_4$), carbon dioxide ($CO_2$), hydrogen sulfide, ($H_2S$) and hydrogen ($H_2$),
(c) optionally, removing solids from the ammonium waste stream to yield solids-depleted ammonium wastewater and isolated solids,
(d) stripping ammonia gas from the ammonium waste stream, debiogased ammonium waste stream, or solids-depleted ammonium wastewater by a process of:
  (i) heating the ammonium waste stream, debiogased ammonium waste stream, or solids-depleted ammonium wastewater to a temperature above a temperature selected from 50 C.° to 90 C°,
  (ii) distilling the ammonia gas released from the heated ammonium waste stream, debiogased ammonium waste stream, or solids-depleted ammonium wastewater through a distillation column using a downflow of the ammonium wastewater and upward stripping gas to yield separated ammonia gas and deammonified wastewater,
(e) delivering the separated ammonia gas to an ammonium scrubber comprising a bottom inlet gas port and a top vent gas port, and
(f) scrubbing ammonium from the ammonia gas in a packed bed vessel to yield an aqueous ammonium salt solution and a vent gas by a process of:
  (i) presenting a certifiably Organic acid solution into the packed bed vessel which traverses in a first direction through the packed bed vessel countercurrent to ammonia gas delivered to the bottom of the packed bed vessel, wherein said ammonia gas traverses through the packed bed vessel in a second direction, wherein the first direction and second directions are oriented in opposite directions.

A2. The process of paragraph A1, wherein the certifiably Organic acid solution comprises a biologically produced acid which has a pKa of between 1.0 and 6.5.

A3. The process of paragraph A2, wherein the certifiably Organic acid has a pKa of between 2.0 and 5.5.

A4. The process of paragraph A1, wherein the certifiably Organic acid solution comprises a acid selected from: citric, malic, lactic, acetic, formic, oxalic, uric, myristiric, tartaric, ascorbic, humic, fulvic, camphorsulfonic, folic, fumaric, gallic, glycolic, lipoic, malonic, salicylic, sorbic, succinic, thioglycolic, thioacetic, propionic, butyric, sorbic, caproic, sulfuric, nitric, or phosphoric.

A5. The process of paragraph A4, wherein the sulfuric, nitric, or phosphoric acids are produced from natural mined sources.

A6. The process of paragraph A1, further comprising step (g): delivering the aqueous ammonium salt solution into a storage tank.

A7. The process of paragraph A1, further comprising blending the aqueous ammonium salt solution with a high-nutrient plant food into a nitrogen-enriched composition, wherein the ammonium salt solution is optionally dried before blending with said high-nutrient plant food.

A8. The process of paragraph A7, wherein the high-nutrient plant food is selected from inorganic fertilizer or organic fertilizer.

A9. The process of paragraph A8, wherein the organic fertilizer is selected from fresh food waste hydrolysate, bat guano, fish emulsion, bone meal, blood meal, animal manure, soy isolate, corn steep liquor (liquid or powder), seaweed, composts, molasses or vinasse, dunder, agricultural and food processing residues and combinations or fermentation products thereof.

A10. The process of paragraph A1, wherein the aqueous ammonium salt solution is further concentrated by removal of a selected amount of water.

A11. The process of paragraph A1, wherein the stripping gas is selected from compressed air, steam, compressed nitrogen, argon, helium, carbon dioxide, carbon monoxide, hydrogen, and combinations thereof.

A12. The process of paragraph A1, wherein the certifiably Organic acid solution is prepared by a process comprising:
  (a) introducing a suitable acid in dry or wet form, allowed for use in organic agriculture, into an acid makeup station,
  (b) optionally if a dry acid is used, adding water to the dry acid to yield a liquid acid solution,
  (c) agitating the acid source to yield a homogenous acid solution, and
  (d) optionally, heating the acid solution to increase the solubility of the acid in solution.

A13. The process of paragraph A1, wherein the deammonified wastewater of step (d)(ii) is recycled and introduced back into the ammonium wastewater source.

A14. The process of paragraph A1, wherein the biogas produced in step (b) is further processed into certifiably Organic sulfuric acid by a process comprising:
  (X) delivering the biogas to a biological sulfur scrubber,
  (Y) adding a gas comprising air and/or oxygen to the biogas or sulfur scrubber vessel, and
  (Z) scrubbing $H_2S$ from the biogas using the aqueous stripping solution to form an aqueous certifiably Organic sulfuric acid solution and desulfurized biogas.

A15. The process of paragraph A14, wherein the certifiably Organic sulfuric acid solution is added to the Certifiably organic acid solution of step (f) in paragraph A1.

A16. The process of paragraph A14, wherein the aqueous scrubbing solution further comprises a biological scrubbing agent.

A17. The process of paragraph A1, wherein the biological scrubbing agent is selected from aqueous solutions of amines, (i.e. mono-, di- or tri-ethanolamine) or aqueous solution of alkaline salts, (i.e. sodium, potassium and calcium hydroxides).

A18. The process of paragraph A14, wherein the desulfurized biogas is recirculated into the system for use as an energy source for one or a plurality of unit operation steps in the system.

A19. The process of paragraph A14, wherein the recirculated desulfurized biogas is used to heat the ammonium wastewater of step (d)(i) in paragraph A1.

A20. The process of paragraph A14, wherein the recirculated desulfurized biogas is used to heat the ammonia stripper or the sulfur scrubber.

A21. The process of paragraph A14, wherein the recirculated desulfurized biogas is used as a fuel cell input to generate electricity.

A22. The process of paragraph A1, wherein the pH is not adjusted prior to, or during step (d).

A23. The process of paragraph A1, wherein step (d)(ii) further comprises collecting the ammonia gas using a condenser column.

A24. The process of paragraph A1, wherein the distillation column further comprises a bubble-cap tray column which further comprises tray risers to enforce unidirectional liquid flow.

A25. The process of paragraph A1, wherein the total nitrogen content of the aqueous ammonium salt solution before dilution or concentration ranges from 4 to 12% (w/w).

A26. The process of paragraph A25, wherein the total nitrogen content of the aqueous ammonium salt solution before dilution or concentration ranges from 4 to 10% (w/w).

A27. The process of paragraph A1, wherein the ammonium wastewater is selected from agricultural or industrial runoff, agricultural, municipal, or industrial wastes including wastewaters, manures (animal or human), food and animal processing wastes petroleum refinery wastewater, blue crab processing wastewater, acetylene purification wastewater, soda ash wastewater, or anaerobically digested, hydrolyzed, or fermented combinations thereof.

A28. The process of any of paragraphs A9 or A27, wherein the fresh food waste hydrolysate is made by a process involving grinding fresh food waste to produce a ground slurry, heating and incubating the ground slurry with one or more selected enzymes with constant agitation and shear, pasteurizing the incubated mixture to produce a hydrolysate, optionally reducing the fats content in the hydrolysate aqueous phase, optionally reducing the solids content in the hydrolysate, and emulsifying the hydrolysate to yield the fresh food waste hydrolysate.

A29. The process of paragraph A1, wherein during step (f), the pH and/or conductivity is monitored.

A30. The process of paragraph A29, wherein when the pH and/or conductivity is outside of a selected range, additional certifiably Organic acid is introduced into the packed bed vessel.

A31. The process of paragraph A1, wherein the pH of the produced aqueous ammonium salt solution is from 4.1 to 8.0

A32. The process of paragraph A1, wherein the pH of the produced aqueous ammonium salt solution is from 4.2 to 6.8.

A33. The process of paragraph A1, wherein the deammonified wastewater has a pH of less than 6.8.

A34. The process of paragraph A1, wherein the deammonified wastewater has an ammonium concentration of less than 30 mg N/L.

A35. The process of paragraph A1, wherein the deammonified wastewater has a nitrate concentration of less than 9 mg N/L.

A36. The process of paragraph A8, wherein the inorganic fertilizer is selected from Grower's standard, urea, ammonium phosphate, ammonium sulfate, ammonium nitrate, potassium nitrate, potassium sulfate, potassium phosphate, potassium chloride (potash), triple superphosphate, magnesium sulfate (Epsom salts), and combinations thereof.

A37. The process of paragraph A1, wherein no foaming occurs during step (d).

A38. The process of paragraph A1, wherein step (a) further comprises adding exogenous base to the liquid organic waste stream.

A39. The process of paragraph A37, wherein the exogenous base is selected from NaOH, KOH, $Ca(OH)_2$, $NaHCO_3$, $Na_2CO_3$, or combinations thereof.

A40. The process of paragraph A1, wherein the produced ammonium salt solution is certifiably Organic.

A41. A system for producing organic ammonium salt solution comprising:
  (a) an ammonium wastewater vessel comprising an inlet port, optionally a recycled deammonified wastewater inlet port, a biogas outlet vent port, optionally an agitation means, and an outlet port coupled to the inlet port of an ammonia stripper,
  (b) an ammonia stripper comprising an inlet port from the ammonium wastewater blending vessel, one or a plurality of stripping gas inlet ports, a deammononified wastewater outlet port, a distillation column which is configured to receive fluids from the inlet port of the ammonium wastewater blending vessel at the top of the distillation column and is also configured to receive stripping gas through the one or plurality of stripping gas inlet ports, a heating means to heat the ammonia stripper to a selected temperature range, and an ammonia gas outlet port which is coupled to an inlet port of an ammonia scrubber,
  (c) an ammonia scrubber comprising an inlet ammonia gas port, a vent gas outlet port, an inlet organic acids port, an aqueous ammonia salt solution outlet port, and a packed bed vessel configured to receive ammonia gas through the inlet ammonia gas port and organic acids through the inlet organic acids port and to vent excess gasses produced by the process through the outlet gas port and to release aqueous ammonia salt solution through the aqueous ammonia salt solution outlet port, and a heating means to heat the ammonia scrubber to a selected temperature range, and
  (d) an aqueous ammonia solution vessel comprising an inlet aqueous ammonia solution coupled to the aqueous ammonia salt solution outlet port of the ammonia scrubber, and optionally an organic fertilizer blending outlet port.

A42. The system of paragraph A41, wherein the distillation column is selected from a bubble cap tray column, packed bed column, or flooded tray column.

A43. The system of paragraph A41, further comprising a solids removal apparatus interposed between the outlet port on the ammonium wastewater blending vessel and the inlet port of the ammonia stripper, wherein the solids removal apparatus comprises a removable mesh screen, wherein solid particles over a selected size range are collected on the mesh screen and prevented from entering the inlet port of the ammonia stripper.

A44. The system of paragraph A41, wherein the deammonified wastewater outlet port on the ammonia stripper is coupled to the recycled deammonified wastewater inlet port of the ammonium wastewater blending vessel.

A45. The system of paragraph A41, further comprising:
  (e) an organic fertilizer blender comprising an aqueous ammonia solution vessel inlet port, a high-nutrient plant food inlet port, an agitation means for blending the high-nutrient plant food with the aqueous ammonia solution, and an outlet port.

A46. The system of paragraph A45, wherein the high-nutrient plant food is selected from inorganic fertilizer or organic fertilizer.

A47. The system of paragraph A46, wherein the organic fertilizer is selected from fresh food waste hydrolysate, bat guano, fish emulsion, bone meal, blood meal, animal manure, and combinations thereof.

A48. The system of paragraph A46, wherein the inorganic fertilizer is selected from Grower's standard, ammonium phosphate, ammonium sulfate, ammonium nitrate, potassium nitrate, potassium sulfate, potassium phosphate, potassium chloride (potash), triple superphosphate, magnesium sulfate (Epsom salts), and combinations thereof.

A49. The system of paragraph A41, further comprising:
(e) an acid makeup vessel comprising an acid source inlet port for receiving organic acids, a water inlet port for receiving water, a means for mixing the organic acids and water, optionally a heating means to heat the acid makeup vessel to a selected temperature range, optionally a bio-sulfuric acid inlet port, and an outlet port coupled to the inlet organic acids port of the ammonia scrubber (c).

A50. The system of paragraph A41, further comprising:
(e) a sulfur scrubber comprising a biogas inlet vent port coupled to the biogas outlet vent port of the ammonium wastewater blending vessel, an oxygen and/or air gas inlet port, one or a plurality of packed bed bio-trickling filters which receive the biogas, oxygen and/or air to separate the biogas into aqueous sulfur compounds and desulfurized biogas, a bio-sulfuric acid outlet port which is coupled to the bio-sulfuric acid inlet port of the acid makeup vessel, and a temperature control means to heat or cool the sulfur scrubber to a selected temperature range.

A51. The ammonium salt solution produced by the process of paragraph A1.

A52. The nitrogen-enriched composition of any of paragraphs A7-A9.

A53. A method for increasing crop yield, the method comprising:
(a) providing the ammonium salt solution of paragraph A51 or the nitrogen-enriched composition of paragraph A52;
(b) contacting the provided nitrogen-enriched composition to a plant or plant component;
(c) periodically administering water to the crops; and
(d) exposing the crops to air and a light source for a period of more than two weeks.

A54. The method of paragraph A53 wherein the plant component is selected from: root, leaves, stems, fruits, flowers, or stalks.

A55. The method of paragraph A53 wherein the water is administered once, twice, or three times every day, two days, three days, four days, five days, six days, or seven days, over a period of two weeks.

A56. The method of paragraph A53 wherein the crop yield is increased by over 10% relative to a nitrate fertilizer alone.

A57. The certifiably Organic sulfuric acid solution of paragraph A14.

A58. A method of reducing pathogen levels in organic fertilizer, the method comprising the steps contacting an aqueous solution comprising ammonium salt with an organic fertilizer to produce a blended pathogen-free nitrogen-enriched organic fertilizer.

A59. The method of paragraph A58, wherein the aqueous solution comprising ammonium salt comprises from 4 to 11% N (w/w).

A60. The method of paragraph A58, wherein the relative amount of the aqueous solution comprising ammonium salt is from 15 to 99 wt. % of the blended pathogen-free nitrogen-enriched organic fertilizer.

The inventions described and claimed herein have many attributes and embodiments including, but not limited to, those set forth or described or referenced in this Detailed Disclosure. It is not intended to be all-inclusive and the inventions described and claimed herein are not limited to or by the features or embodiments identified in this Detailed Disclosure, which is included for purposes of illustration only and not restriction. A person having ordinary skill in the art will readily recognize that many of the components and parameters may be varied or modified to a certain extent or substituted for known equivalents without departing from the scope of the invention. It should be appreciated that such modifications and equivalents are herein incorporated as if individually set forth. The invention also includes all of the steps, features, compositions and compounds referred to or indicated in this specification, individually or collectively, and any and all combinations of any two or more of said steps or features.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents. Reference to any applications, patents and publications in this specification is not, and should not be taken as, an acknowledgment or any form of suggestion that they constitute valid prior art or form part of the common general knowledge in any country in the world.

The specific methods and compositions described herein are representative of preferred embodiments and are exemplary and not intended as limitations on the scope of the invention. Other objects, embodiments, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of this, any of the terms "comprising", "consisting essentially of", and "consisting of" may be replaced with either of the other two terms in the specification. Also, the terms "comprising", "including", containing", etc. are to be read expansively and without limitation. The methods and processes illustratively described herein suitably may be practiced in differing orders of steps, and that they are not necessarily restricted to the orders of steps indicated herein or in the claims. It is also that as used herein and in the appended claims, the singular forms "a," "an," and "the"

include plural reference unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants. Furthermore, titles, headings, or the like are provided to enhance the reader's comprehension of this document, and should not be read as limiting the scope of this. Any examples of embodiments, embodiments or components of the invention referred to herein are to be considered non-limiting.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although this has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or embodiments of the invention are described in terms of Markush groups, those skilled in the art will recognize that the invention is also thereby described in terms of any individual member or subgroup of members of the Markush group.

We claim:

1. A process for producing an ammonium salt composition from a liquid organic waste stream comprising ammonium, the process comprising the steps of:
    (a) providing a liquid organic waste stream comprising dissolved ammonium (ammonium waste stream),
    (b) separating biogas from the ammonium waste stream to yield debiogased ammonium waste stream, wherein the biogas comprises one or a plurality of gases selected from: methane ($CH_4$), carbon dioxide ($CO_2$), hydrogen sulfide, ($H_2S$) and hydrogen ($H_2$),
    (c) removing solids from the ammonium waste stream to yield solids-depleted ammonium wastewater and isolated solids,
    (d) stripping ammonia gas from the solids-depleted ammonium wastewater by a process of:
        (i) heating the solids-depleted ammonium wastewater to a temperature between 50° to 90° C., and
        (ii) distilling the ammonia gas released from the heated solids-depleted ammonium wastewater through a distillation column using a downflow of the ammonium wastewater and upward stripping gas to yield separated ammonia gas and deammonified wastewater,
    (e) delivering the separated ammonia gas to an ammonium scrubber comprising a bottom inlet gas port and a top vent gas port, and
    (f) scrubbing ammonium from the ammonia gas in a packed bed vessel to yield an aqueous ammonium salt solution and a vent gas by a process of presenting an acid solution into the packed bed vessel which traverses in a first direction through the packed bed vessel countercurrent to ammonia gas delivered to the bottom of the packed bed vessel,
    wherein said ammonia gas traverses through the packed bed vessel in a second direction,
    wherein the first direction and second directions are oriented in opposite directions, and
    wherein the biogas produced in step (b) is further processed into sulfuric acid by a process comprising:
        (X) delivering the biogas to a biological sulfur scrubber,
        (Y) adding a gas comprising air and/or oxygen to the biogas or sulfur scrubber vessel, and
        (Z) scrubbing $H_2S$ from the biogas using an aqueous stripping solution to form an aqueous sulfuric acid solution and desulfurized biogas.

2. The process of claim 1, wherein the acid solution of step (f) comprises an acid selected from: citric, malic, lactic, acetic, formic, oxalic, uric, myristiric, tartaric, ascorbic, humic, fulvic, camphorsulfonic, folic, fumaric, gallic, glycolic, lipoic, malonic, salicylic, sorbic, succinic, thioglycolic, thioacetic, propionic, butyric, sorbic, caproic, sulfuric, nitric, phosphoric, or combinations thereof.

3. The process of claim 1, wherein the upward stripping gas is selected from compressed air, steam, compressed nitrogen, argon, helium, carbon dioxide, carbon monoxide, hydrogen, and combinations thereof.

4. The process of claim 1, wherein the sulfuric acid solution is added to the acid solution of step (f).

5. The process of claim 1, wherein the aqueous scrubbing solution further comprises a biological scrubbing agent.

6. The process of claim 5, wherein the biological scrubbing agent is selected from an aqueous solution comprising: monoethanolamine, diethanolamine, triethanolamine, sodium hydroxide, potassium hydroxide, lithium hydroxide, calcium hydroxide, or mixtures thereof.

7. The process of claim 1, wherein the pH is not adjusted prior to, or during step (d).

8. The process of claim 1, wherein the distillation column further comprises a bubble-cap tray column which further comprises tray risers to enforce unidirectional liquid flow.

9. The process of claim 8, wherein no foaming occurs during step (d).

10. The process of claim 1, wherein the total nitrogen content of the aqueous ammonium salt solution before dilution or concentration ranges from 4 to 12% (w/w).

11. The process of claim 1, wherein the liquid organic waste stream is selected from agricultural runoff, industrial runoff, agricultural waste, municipal waste, industrial waste, animal manure, human manure, food processing waste, animal butchering waste, petroleum refinery wastewater, blue crab processing wastewater, acetylene purification wastewater, soda ash wastewater, or anaerobically digested, hydrolyzed, or fermented combinations thereof.

12. The process of claim 1, wherein during step (f), the pH and/or conductivity is monitored, and wherein when the pH is outside of the range 4.2 to 6.8, additional acid is introduced into the packed bed vessel.

13. The process of claim 1, wherein the deammonified wastewater has an ammonium concentration of less than 30 mg N/L.

14. The process of claim 1, wherein step (a) further comprises adding exogenous base to the liquid organic waste stream.

15. The process of claim 14, wherein the exogenous base is selected from NaOH, KOH, $Ca(OH)_2$, $NaHCO_3$, $Na_2CO_3$, or combinations thereof.

* * * * *